(12) United States Patent
Blum et al.

(10) Patent No.: US 6,986,579 B2
(45) Date of Patent: Jan. 17, 2006

(54) METHOD OF MANUFACTURING AN ELECTRO-ACTIVE LENS

(75) Inventors: Ronald D. Blum, Roanoke, VA (US); William Kokonaski, Gig Harbor, WA (US); Dwight P. Duston, Laguna Niguel, CA (US)

(73) Assignee: E-Vision, LLC, Roanoke, VA (US)

( * ) Notice: Subject to any disclaimer, the term of this patent is extended or adjusted under 35 U.S.C. 154(b) by 0 days.

(21) Appl. No.: 10/644,112

(22) Filed: Aug. 20, 2003

(65) Prior Publication Data

US 2004/0084790 A1 May 6, 2004

Related U.S. Application Data

(63) Continuation-in-part of application No. 10/422,128, filed on Apr. 24, 2003, which is a continuation-in-part of application No. 10/387,143, filed on Mar. 12, 2003, which is a continuation-in-part of application No. 10/281,204, filed on Oct. 28, 2002, now Pat. No. 6,733,130, which is a continuation-in-part of application No. 10/263,707, filed on Oct. 4, 2002, now abandoned, which is a continuation-in-part of application No. 10/046,244, filed on Jan. 16, 2002, which is a continuation-in-part of application No. 09/603,736, filed on Jun. 23, 2000, now Pat. No. 6,491,391, which is a continuation-in-part of application No. 09/602,014, filed on Jun. 23, 2000, now Pat. No. 6,491,394, which is a continuation-in-part of application No. 09/602,013, filed on Jun. 23, 2000, now Pat. No. 6,619,799, which is a continuation-in-part of application No. 09/602,012, filed on Jun. 23, 2000, now Pat. No. 6,517,203.

(60) Provisional application No. 60/404,657, filed on Aug. 20, 2002, provisional application No. 60/401,700, filed on Aug. 7, 2002, provisional application No. 60/375,028, filed on Apr. 25, 2002, provisional application No. 60/363,549, filed on Mar. 13, 2002, provisional application No. 60/331,419, filed on Nov. 15, 2001, provisional application No. 60/326,991, filed on Oct. 5, 2001, provisional application No. 60/261,805, filed on Jan. 17, 2001, provisional application No. 60/161,363, filed on Oct. 26, 1999, provisional application No. 60/150,564, filed on Aug. 25, 1999, provisional application No. 60/150,545, filed on Aug. 25, 1999, provisional application No. 60/147,813, filed on Aug. 10, 1999, provisional application No. 60/143,626, filed on Jul. 14, 1999, provisional application No. 60/142,053, filed on Jul. 2, 1999.

(51) Int. Cl.
G02C 7/02 (2006.01)

(52) U.S. Cl. .................... 351/177; 351/176

(58) Field of Classification Search ............. 351/159, 351/161, 163–165, 168–169, 176–177, 41, 351/44, 205, 209; 359/665–666
See application file for complete search history.

(56) References Cited

U.S. PATENT DOCUMENTS

| | | |
|---|---|---|
| 2,437,642 A | 3/1948 | Henroteau |
| 2,576,581 A | 11/1951 | Edwards |
| 3,161,718 A | 12/1964 | de Luca |
| 3,245,315 A | 4/1966 | Marks et al. |
| 3,614,215 A | 10/1971 | Mackta |
| 3,738,734 A | 6/1973 | Tait et al. |
| 4,174,156 A | 11/1979 | Glorieux |
| 4,181,408 A | 1/1980 | Senders |
| 4,190,330 A | 2/1980 | Berreman |
| 4,264,154 A | 4/1981 | Petersen |
| 4,279,474 A | 7/1981 | Belgorod |
| 4,300,818 A | 11/1981 | Schachar |
| 4,373,218 A | 2/1983 | Schachar |
| 4,395,736 A | 7/1983 | Fraleux |
| 4,418,990 A | 12/1983 | Gerber |
| 4,457,585 A | 7/1984 | DuCorday |
| 4,466,706 A | 8/1984 | Lamothe, II |
| 4,529,268 A | 7/1985 | Brown |
| 4,564,267 A | 1/1986 | Nishimoto |
| 4,572,616 A | 2/1986 | Kowel et al. |
| 4,577,928 A | 3/1986 | Brown |
| 4,601,545 A | 7/1986 | Kern |

| | | |
|---|---|---|
| 4,609,824 A | 9/1986 | Munier et al. |
| 4,712,870 A | 12/1987 | Robinson et al. |
| 4,756,605 A | 7/1988 | Okada et al. |
| 4,772,094 A | 9/1988 | Sheiman |
| D298,250 S | 10/1988 | Kildall |
| 4,787,733 A | 11/1988 | Silva |
| 4,795,248 A | 1/1989 | Okada et al. |
| 4,818,095 A | 4/1989 | Takeuchi |
| 4,836,652 A | 6/1989 | Oishi et al. |
| 4,880,300 A | 11/1989 | Payner et al. |
| 4,904,063 A | 2/1990 | Okada et al. |
| 4,907,860 A | 3/1990 | Noble |
| 4,919,520 A | 4/1990 | Okada et al. |
| 4,927,241 A | 5/1990 | Kuijk |
| 4,929,865 A | 5/1990 | Blum |
| 4,930,884 A | 6/1990 | Tichenor et al. |
| 4,945,242 A | 7/1990 | Berger et al. |
| 4,952,788 A | 8/1990 | Berger et al. |
| 4,958,907 A | 9/1990 | Davis |
| 4,961,639 A | 10/1990 | Lazarus |
| 4,968,127 A | 11/1990 | Russell et al. |
| 4,981,342 A | 1/1991 | Fiala |
| 4,991,951 A | 2/1991 | Mizuno et al. |
| 5,015,086 A | 5/1991 | Okaue et al. |
| 5,030,882 A | 7/1991 | Solero |
| 5,050,981 A | 9/1991 | Roffman |
| 5,066,301 A | 11/1991 | Wiley |
| 5,073,021 A | 12/1991 | Marron |
| 5,076,665 A | 12/1991 | Petersen |
| 5,091,801 A | 2/1992 | Ebstein |
| 5,108,169 A | 4/1992 | Mandell |
| 5,114,628 A | 5/1992 | Höfer et al. |
| 5,130,856 A | 7/1992 | Tichenor et al. |
| 5,142,411 A | 8/1992 | Fiala |
| 5,171,266 A | 12/1992 | Wiley et al. |
| 5,182,585 A | 1/1993 | Stoner |
| 5,184,156 A | 2/1993 | Black et al. |
| 5,200,859 A | 4/1993 | Payner et al. |
| 5,208,688 A | 5/1993 | Fergason et al. |
| 5,229,885 A | 7/1993 | Quaglia |
| 5,239,412 A | 8/1993 | Naka et al. |
| D342,063 S | 12/1993 | Howitt et al. |
| 5,306,926 A | 4/1994 | Yonemoto |
| 5,324,930 A | 6/1994 | Jech, Jr. |
| D350,342 S | 9/1994 | Sack |
| 5,352,886 A | 10/1994 | Kane |
| 5,359,444 A | 10/1994 | Piosenka et al. |
| 5,375,006 A | 12/1994 | Haas |
| 5,382,986 A | 1/1995 | Black et al. |
| 5,386,308 A | 1/1995 | Michel et al. |
| 5,440,357 A | 8/1995 | Quaglia |
| 5,443,506 A | 8/1995 | Gurabet |
| 5,451,766 A | 9/1995 | Van Berkel |
| 5,488,439 A | 1/1996 | Weltmann |
| 5,522,323 A | 6/1996 | Richard |
| 5,552,841 A * | 9/1996 | Gallorini et al. ............... 351/49 |
| 5,608,567 A | 3/1997 | Grupp |
| 5,615,588 A | 4/1997 | Gottschald |
| 5,654,786 A | 8/1997 | Bylander |
| 5,682,223 A | 10/1997 | Menezes et al. |
| RE35,691 E | 12/1997 | Theirl et al. |
| 5,712,721 A | 1/1998 | Large |
| 5,728,155 A | 3/1998 | Anello et al. |
| 5,739,959 A | 4/1998 | Quaglia |
| 5,777,719 A | 7/1998 | Williams et al. |
| 5,815,233 A | 9/1998 | Morokawa et al. |
| 5,815,239 A | 9/1998 | Chapman et al. |
| 5,861,936 A | 1/1999 | Sorenson |
| 5,900,720 A | 5/1999 | Kallman et al. |
| 5,949,521 A | 9/1999 | Williams et al. |
| 5,953,098 A | 9/1999 | Lieberman et al. |
| 5,980,037 A | 11/1999 | Conway |
| 6,086,204 A | 7/2000 | Magnante |
| 6,095,651 A | 8/2000 | Williams et al. |
| 6,099,117 A * | 8/2000 | Gregory ...................... 351/49 |
| 6,145,987 A | 11/2000 | Baude et al. |
| 6,213,602 B1 * | 4/2001 | Smarto ....................... 351/159 |
| 6,305,802 B1 | 10/2001 | Roffman et al. |
| 6,325,508 B1 | 12/2001 | Decreton et al. |
| 6,437,925 B1 | 8/2002 | Nishioka |
| 6,464,363 B1 | 10/2002 | Nishioka et al. |
| 6,554,425 B1 | 4/2003 | Roffman et al. |
| 6,609,794 B2 | 8/2003 | Levine |
| 6,616,275 B1 | 9/2003 | Dick et al. |
| 6,616,279 B1 | 9/2003 | Davis et al. |
| 6,626,532 B1 | 9/2003 | Nishioka et al. |
| 6,631,001 B2 | 10/2003 | Kuiseko |
| 6,682,195 B2 | 1/2004 | Dreher |
| 2004/0179280 A1 * | 9/2004 | Nishioka .................... 359/846 |
| 2005/0073739 A1 * | 4/2005 | Meredith et al. .......... 359/319 |

FOREIGN PATENT DOCUMENTS

| | | |
|---|---|---|
| EP | 0 154 962 A2 | 9/1985 |
| EP | 0 233 104 A1 | 8/1987 |
| EP | 0 237 365 A1 | 9/1987 |
| GB | 2169417 A | 7/1986 |
| GB | 2170613 A | 8/1986 |
| JP | 55-076323 | 6/1980 |
| JP | 1-237610 | 9/1989 |
| JP | 10366043 | 12/1998 |
| WO | PCT/US91/04976 | 7/1991 |
| WO | PCT/US97/21688 | 11/1997 |
| WO | WO 98/27863 | 7/1998 |
| WO | WO 03/050472 A1 | 6/2003 |
| WO | WO 03/068059 A2 | 8/2003 |
| WO | WO 2004/008189 A1 | 1/2004 |
| WO | WO 2004/015481 A1 | 2/2004 |
| WO | WO 2004/034095 A2 | 4/2004 |

OTHER PUBLICATIONS

M. Anderson, "Adaptive Optics: Liquid Crystals Lower the Cost of Adaptive Optics", *Laser Focus World*, Dec. 1999.

"Focusing by Electrical Modulation of Refraction in a Liquid Crystal Cell"; Stephen T. Kowel et al.,*Applied Optics*, vol. 23, No. 2, Jan. 15, 1984, pp. 278-289.

"Computer Vision Syndrome—The Eyestrain Epidemic"; Robert A. Davis, O.D., *Review of Optometry*, Sep. 15, 1997, pp. 80-88.

"The Use of Yoked Base-Up and Base-In Prism for Reducing Eye Strain at the Computer"; Stuart M. Lazarus, O.D., *Journal of the American Optometric Association*, Apr. 1996, pp. 204-208.

*Eyecare Business*, Oct. 1997 (entire issue).

"Vision Through a Liquid-Crystal Spatial Light Modulator"; Larry N. Thibos et al., *Inpress*, Adaptive Optics Conference, Durham, United Kingdom, 1999.

"Requirements for Segmented Spatial Light Modulators for Diffraction-Limited Imaging Through Aberrated Eyes"; Larry N. Thibos et al., *Inpress*, Adaptive Optics Conference, Durham, United KIngdom, 1999.

"Use of Liquid-Crystal Adaptive-Optics to Alter the Refractive State of the Eye"; Larry N. Thibos et al., *Optometry and Vision Science*, vol. 74, No. 7, Jul. 1997.

"Electronic Spectacles for the 21$^{st}$ Century", *Indiana Journal of Optometry*, vol. 2, No. 1, 1999.

"Profile: Larry N. Thibos, Ph.D. and Donald Miller, Ph.D.", *Indiana Journal of Optometry*, vol. 2, No. 1, pp. 5-10, 1999.

"Control Optimization of Spherical Modal Liquid Crystal Lenses"; A. F. Naumov and G. D. Love, *Optics Express*, vol. 4, No. 9, Apr. 26, 1999, pp. 344-352.

"Liquid Crystal Adaptive Lenses with Modal Control"; A. F. Naumov and M. Yu Loktev, *Optics Letters*, vol. 23, No. 13, Jul. 1, 1998, pp. 992-994.

"Liquid Lenses Eye Commercial Breakthrough" (Internet Article under "Optics.org"); from *Opto & Laser*, Nov. 2003.

* cited by examiner

*Primary Examiner*—Jordan M. Schwartz
(74) *Attorney, Agent, or Firm*—Hunton & Williams LLP

(57) ABSTRACT

A method of manufacturing an electro-active lens is disclosed. The lens is manufactured by providing a lens blank having a front and back surface, a thickness, and an index of refraction. An electro-active element is placed on one of the front or back surfaces of the lens blank. A covering surface is then formed over the surface of the lens blank containing the electro-active element. In some embodiments, the electro-active lens may then be surfaced to provide a desired fixed optical power and edged to fit within a spectacles frame.

25 Claims, 29 Drawing Sheets

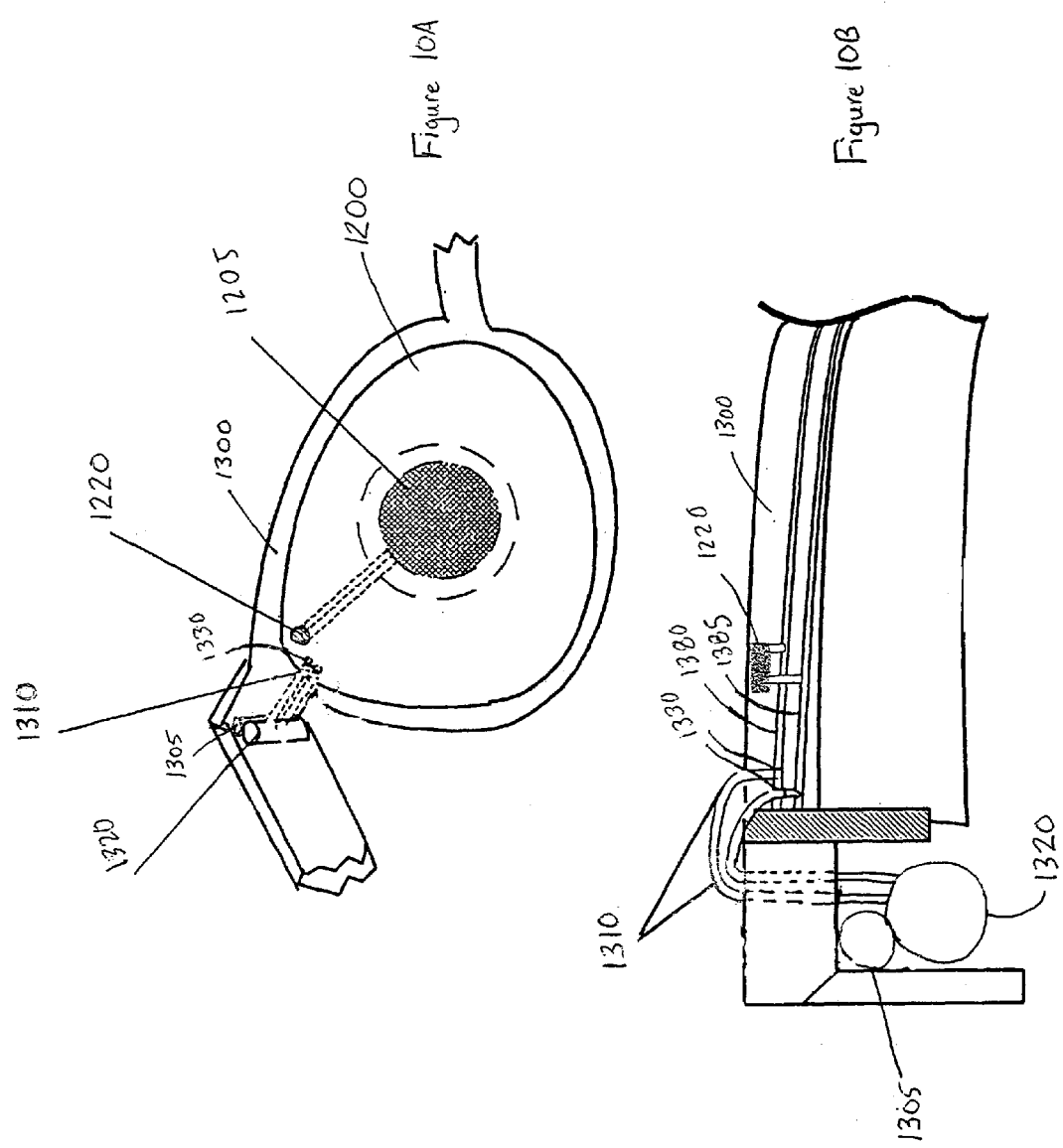

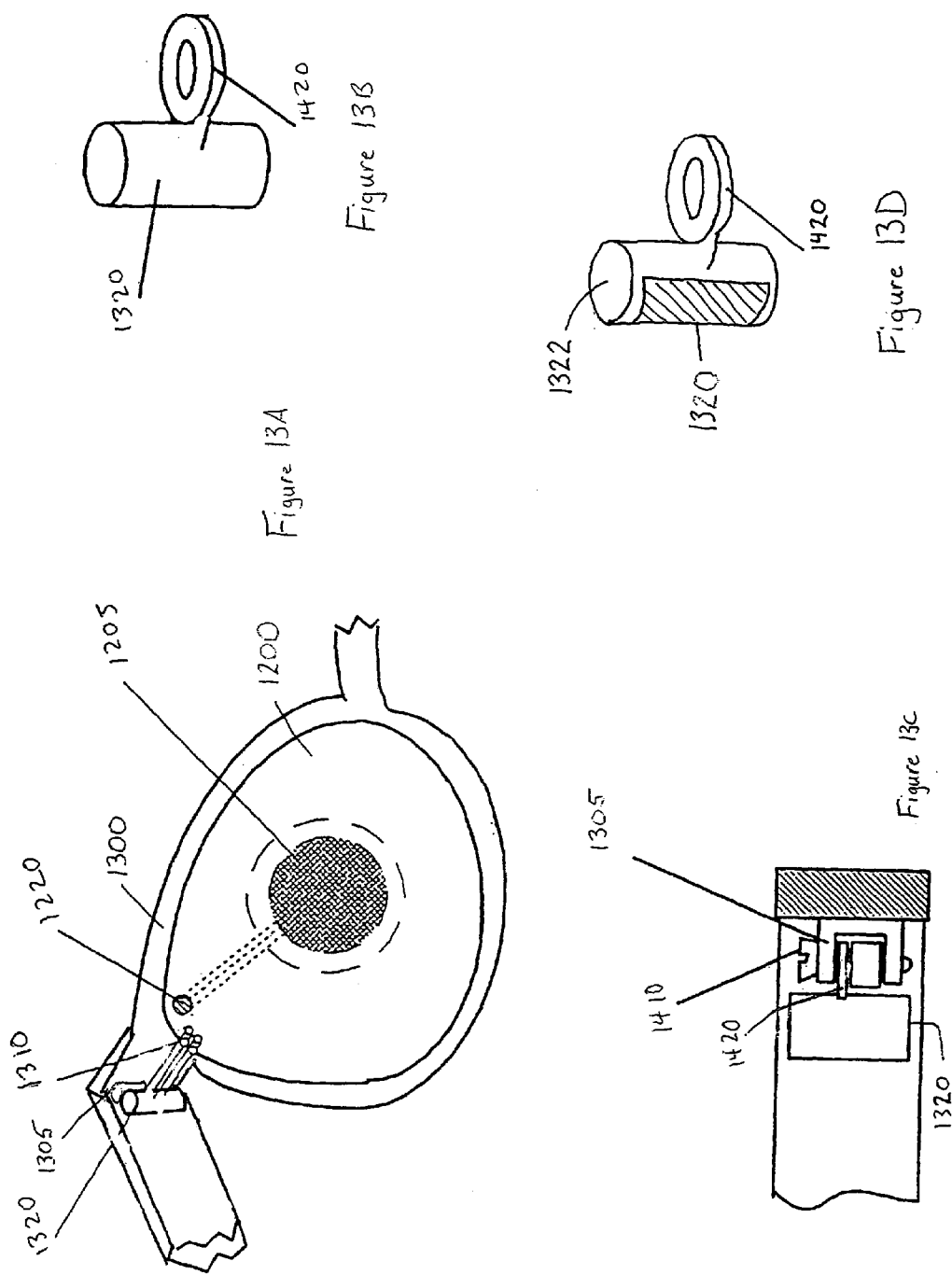

2060

METHOD OF MANUFACTURING AN ELECTRO-ACTIVE LENS

This application claims the benefit of U.S. Provisional Application No. 60/404,657 filed Aug. 20, 2002. This application is also a continuation-in-part of U.S. patent application Ser. No. 10/422,128 filed Apr. 24, 2003, which claims the benefit of U.S. Provisional Application No. 60/375,028, filed Apr. 25, 2002, and which is a continuation-in-part of U.S. patent application Ser. No. 10/387,143, filed Mar. 12, 2003, which claims the benefit of U.S. Provisional Application Nos. 60/363,549, filed Mar. 13, 2002 and 60/401,700, filed Aug. 7, 2002, and which is a continuation-in-part of U.S. patent application Ser. No. 10/263,707 filed Oct. 4, 2002 now abandoned, Ser. No. 10/281,204, filed Oct. 28, 2002 now U.S. Pat. No. 6,733,130 and Ser. No. 10/046,244, filed Jan. 16, 2002. U.S. patent application Ser. No. 10/263,707 claims the benefit of U.S. Provisional Application Nos. 60/331,419, filed Nov. 15, 2001, and 60/326,991, filed Oct. 5, 2001. U.S. patent application Ser. No. 10/281,204 is a continuation Ser. No. 09/602,014 now U.S. Pat. No. 6,491,394, filed Jun. 23, 2000. U.S. patent application Ser. No. 10/046,244 claims the benefit of U.S. Provisional Application Nos. 60/261,805, filed Jan. 17, 2001, 60/331,419, filed Nov. 15, 2001, and 60/326,991, filed Oct. 5, 2001, and is a continuation-in-part of Ser. No. 09/603,736, now U.S. Pat. No. 6,491,391, filed Jun. 23, 2000, Ser. No. 09/602,014, now U.S. Pat. No. 6,491,394, filed Jun. 23, 2000, and Ser. No. 09/602,012, now U.S. Pat. No. 6,517,203, filed Jun. 23, 2000, and U.S. patent application Ser. No. 09/602,013, now U.S. Pat. No. 6,619,799 filed Jun. 23, 2000; all of which claim priority to U.S. Provisional Application Nos. 60/142,053, filed Jul. 2, 1999, 60/143,626, filed Jul. 14, 1999, 60/147,813, filed Aug. 10, 1999, 60/150,545, filed Aug. 25, 1999, 60/150,564, filed Aug. 25, 1999, and 60/161,363, filed Oct. 26, 1999. All of the foregoing applications, provisional applications, and patents are herein incorporated by reference in their entirety.

FIELD OF THE INVENTION

The present invention relates to an efficient method of manufacturing an electro-active lens.

SUMMARY OF THE INVENTION

In an exemplary embodiment of the invention, a method of manufacturing an electro-active lens from a lens blank is disclosed. The lens blank comprises a front surface, a back surface, a thickness and an index of refraction. An electro-active element may be placed on either the front or back surface of the lens blank. The method further comprises forming a covering layer over the surface of the lens blank containing the electro-active element.

In another exemplary embodiment, another method of manufacturing an electro-active lens is disclosed. The method comprises molding a lens blank having a front surface, a back surface, a thickness and an index of refraction around an electro-active element.

Aspects of the present invention will now be described in more detail with reference to exemplary embodiments thereof as shown in the appended drawings.

BRIEF DESCRIPTION OF THE DRAWINGS

FIG. 10A illustrates a rear view of a spectacles frame having an electro-active lens manufactured according to an exemplary embodiment of the invention.

FIG. 10B illustrates a top view of a spectacles frame having an electro-active lens manufactured according to an exemplary embodiment of the invention.

FIGS. 13A–13D illustrate a battery attachment mounted on or near a frame hinge according to an exemplary embodiment of the invention.

DETAILED DESCRIPTION OF PREFERRED EMBODIMENTS

Figure 1:
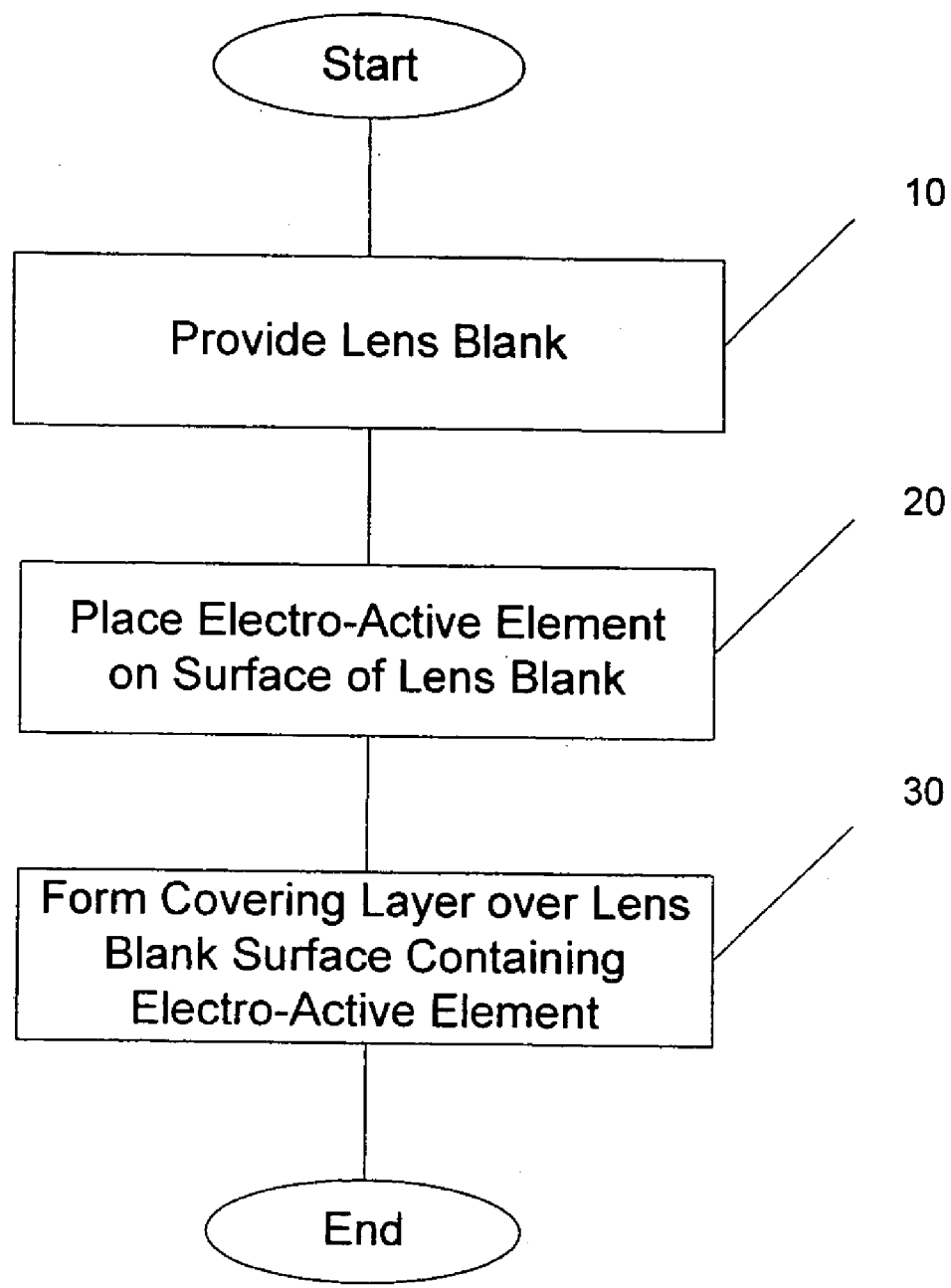
FIG. 1 is a flow chart of a method of manufacturing an electro-active lens according to an exemplary embodiment of the invention.

In 1998, there were approximately 92 million eye examinations performed in the United States alone. The vast majority of these examinations involved a thorough check for eye pathology both internal and external, analysis of muscle balance and binocularity, measurement of the cornea and, in many cases, the pupil, and finally a refractive examination, which was both objective and subjective.

Refractive examinations are performed to understand/diagnose the magnitude and type of the refractive error of one's eye. The types of refractive error that are currently able to be diagnosed & measured, are myopia, hyperopia, astigmatism, and presbyopia. Current refractors (phoropters) attempt to correct one's vision to 20/20 distance and near vision. In some cases, 20/15 distance vision can be achieved; however, this is by far the exception.

It should be pointed out that the theoretical limit to which the retina of one's eye can process and define vision is approximately 20/08. This is far better than the level of vision which is currently obtained by way of both today's refractors (phoropters) and conventional spectacle lenses. What is missing from these conventional devices is the ability to correct for non-conventional refractive error, such as aberrations, irregular astigmatism, or ocular layer irregularities. These aberrations, irregular astigmatism, and/or ocular layer irregularities may be a result of one's visual system or a result of aberrations caused by conventional eyeglasses, or a combination of both.

In accordance with exemplary embodiments of the invention, methods of manufacturing an electro-active lens are disclosed. The electro-active lens may be used to provide vision correction for one or more focal lengths, and may further correct non-conventional refractive error including higher order aberrations.

To assist with understanding certain embodiments of the invention, explanations of various terms are now provided. "Attaching" can include bonding, depositing, adhering, and other well-known attachment methods. A "controller" can include or be included in a processor, a microprocessor, an integrated circuit, a computer chip, and/or a chip. A "conductive bus" operates to conduct data in the form of an electrical signal from one place to another place. "Near distance refractive error" can include presbyopia and any other refractive error needed to be corrected for one to see clearly at near distance. "Intermediate distance refractive error" can include the degree of presbyopia needed to be corrected an intermediate distance and any other refractive error needed to be corrected for one to see clearly at intermediate distance. "Far distance refractive error" can include any refractive error needed to be corrected for one to see clearly at far distance. "Conventional refractive error" can include myopia, hyperopia, astigmatism, and/or presbyopia. "Non-conventional refractive error" can include irregular astigmatism, aberrations of the ocular system including coma, chromatic aberrations, and spherical aberrations, as well as any other higher order aberrations or refractive error not included in conventional refractive error. "Optical refractive error" can include any aberrations associated with a lens optic.

In certain embodiments, a "spectacle" can include one lens. In other embodiments, a "spectacle" can include more than one lens. A "multi-focal" lens can include bifocal, trifocal, quadrafocal, and/or progressive addition lens. A "finished" lens blank can include a lens blank that has a finished optical surface on both sides. A "semi-finished" lens blank can include a lens blank that has, on one side only, a finished optical surface, and on the other side, a non-optically finished surface, the lens needing further modifications, such as, for example, grinding and/or polishing, to make it into a useable lens. An "unfinished" lens blank has no finished surface on either side. "Base lens" refers to the non-electro-active portion of a lens blank which has been finished.

"Surfacing" can include grinding and/or polishing off excess material to finish a non-finished surface of a semi-finished or unfinished lens blank. The lens blank may also be finished using free form machining techniques that have recently been adopted by the ophthalmic lens industry. Free forming techniques allow a completely arbitrary shape to be placed on the lens blank that may be used to complete conventional error correction, but may also be used to correct higher order aberrations to provide for a non-conventional error correction that may lead to vision correction better than 20/20. Further, the lens blank can be fabricated by bonding two or more lens wafers together to form a finished lens or a semi-finished lens blank. It should be appreciated that the lens blank, whether finished, unfinished, or semi-finished, may initially be fabricated using free form techniques to correct for either or both of conventional and non-conventional refractive error.

A method of manufacturing an electro-active lens is disclosed as shown in FIG. 1. The method comprises providing a lens blank as shown in step 10. The lens blank may be any type of lens blank and has a front and back surface, a thickness, and an index of refraction. In step 20, an electro-active element is placed on either the front or back surface of the lens blank. In step 30, a covering layer is formed over the surface of the lens blank containing the electro-active element. This covering layer protects the electro-active element and fixes the electro-active element at a location on the lens blank. The material used to create the covering layer may also, in combination with the lens blank, provide a fixed distance vision correction to a wearer of the lens.

The electro-active element may comprise one or more layers of electro-active material, such as a polymer gel and/or liquid crystals which, when activated by an applied electrical voltage, produce an index of refraction which is variable with the amount of the electrical voltage applied to the electro-active material. When a wearer views through an area of the electro-active lens containing the electro-active element, the wearer may achieve vision correction based on the index of refraction of the electro-active element, which may be in addition to vision correction provided by the non-electro-active portion of the lens. Suitable electro-active materials include various classes of liquid crystals and polymer gels. These classes include nematic, smectic, and cholesteric liquid crystals, polymer liquid crystals, polymer dispersed liquid crystals, and polymer stabilized liquid crystals as well as electro-optic polymers.

If liquid crystals such as nematic liquid crystals are used as the electro-active material, an alignment layer may be required because nematic and many other liquid crystals, are birefringent. That is, they display two different focal lengths when exposed to unpolarized light absent an applied voltage. This birefringence gives rise to double or fuzzy images on the retina. To alleviate this birefringence, a second layer of electro-active material may be used, aligned orthogonal to the first layer of electro-active material. In this manner, both polarizations of light are focused equally by both of the layers, and all light is focused at the same focal length.

Alternatively, the use of cholesteric liquid crystals, which have a large chiral component, may be used instead as a preferred electro-active material. Unlike nematic and other common liquid crystals, cholesteric liquid crystals do not have the polarity of nematic liquid crystals, avoiding the need for multiple layers of electro-active material.

Various electro-active layers which may be used in the electro-active element of embodiments of the present invention are described in the aforementioned applications which have previously been incorporated by reference in their entirety.

The lens blank may be any type of lens blank and may include, for example, a semi-finished blank, an unfinished lens blank, a lens wafer, a preformed optic or a finished lens. The covering layer may be formed by conformal sealing such as by molding or surface-casting, or by covering the lens blank with a lens wafer.

Figure 2:
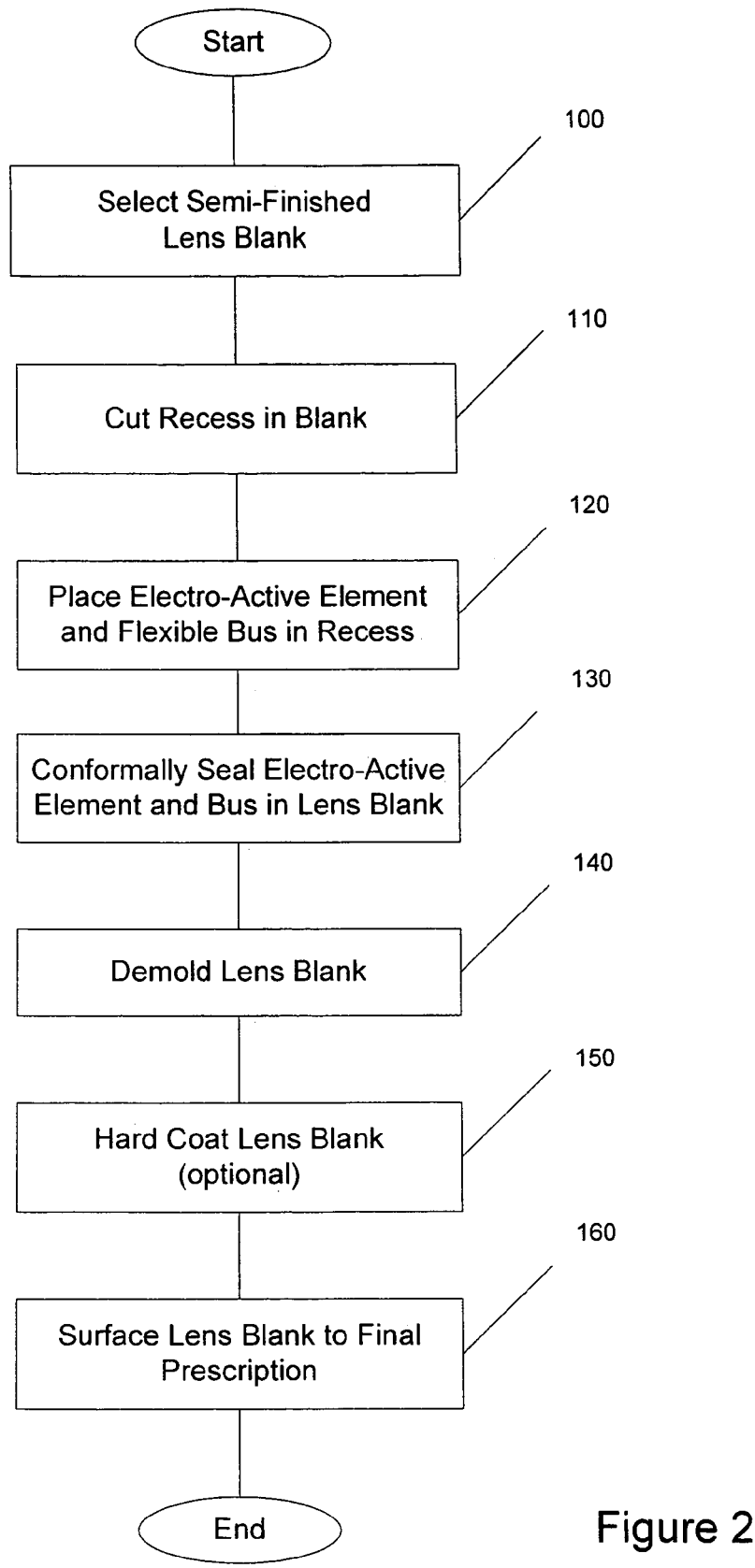
FIG. 2 is a flow chart of a method of manufacturing an electro-active lens according to an exemplary embodiment of the invention.
Figure 2A:
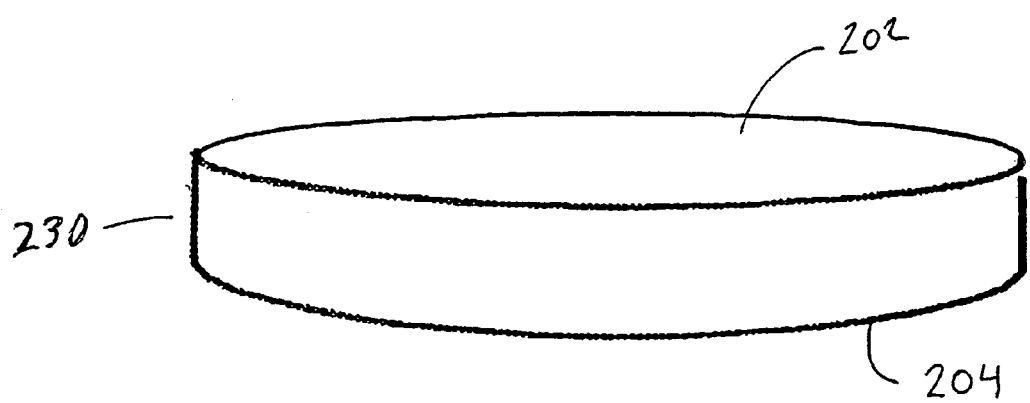
FIGS. 2A–2F illustrate a lens at various stages in the method shown in FIG. 2.
Figure 2B:
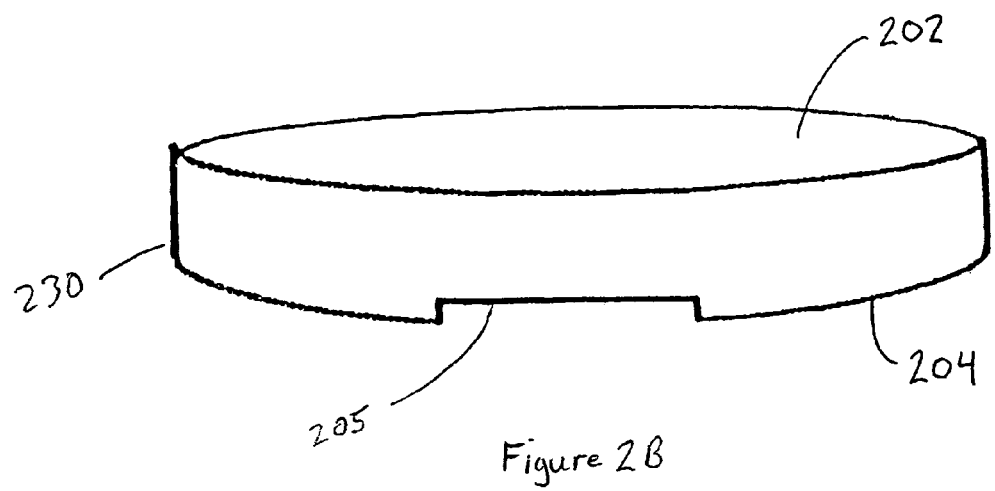
Figure 2C:
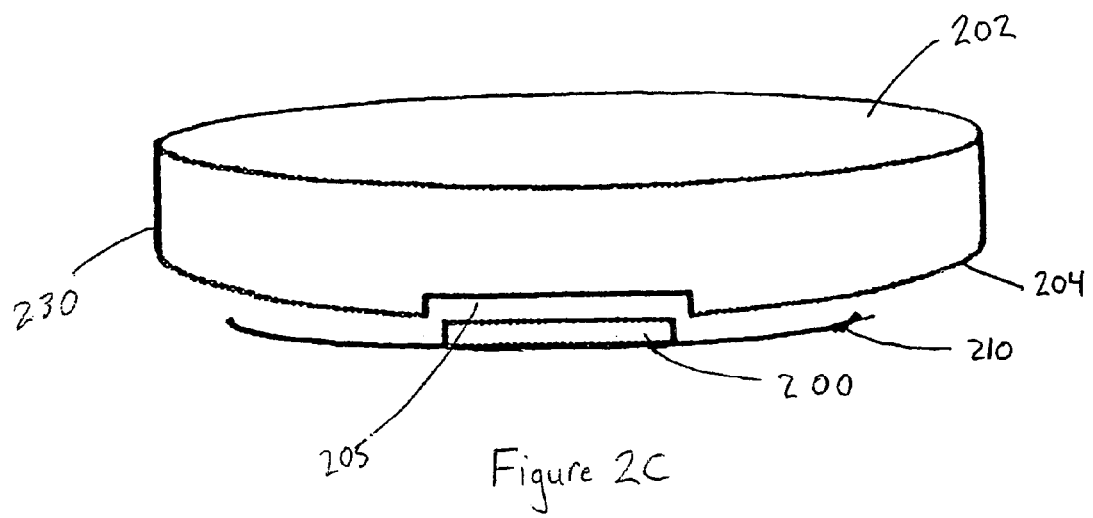

In an exemplary embodiment of the invention, an electro-active lens is manufactured from a semi-finished blank, with a covering layer formed by conformal sealing. An electro-active element may be placed on either the front or back surface of the semi-finished blank. The conformal seal forms a protective covering layer over the surface of the lens blank on which the electro-active element was placed, burying the electro-active element within the lens. FIG. 2 is a flow chart which illustrates a method of manufacturing the electro-active lens using conformally sealed semi-finished blanks according to an embodiment of the invention. FIGS. 2A–E illustrate the lens at various stages of the method illustrated in FIG. 2. At step 100, a semi-finished blank 230, having a back concave surface 202 and a front convex surface 204, may be selected, as shown in FIG. 2A. At step 110, a recess 205 may be cut in the front convex surface 204 of the semi-finished blank 230, as shown in FIG. 2B. At step 120, an electro-active element 200 may be placed in the recess 205. Additionally, a conductive bus 210 connected to the electro-active element 200 may be placed in the recess 205. Preferably, the conductive bus 210 may be constructed of an optically transparent, flexible material, such as an extruded or cast polymer film of ophthalmic grade material which has been coated with a transparent conducting material such as indium-tin-oxide and/or conductive polymers. The conductive bus 210 may have a plurality of apertures, which may promote better bonding of the conductive bus to the lens blank 230.

Figure 2D:
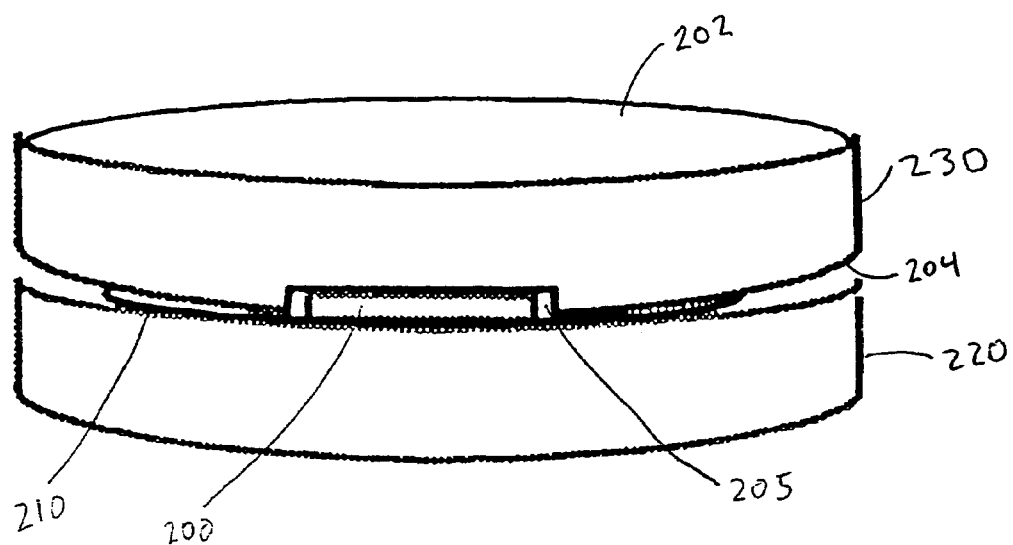

At step 130, the electro-active element 200 and the conductive bus 210 can be conformally sealed into the semi-finished blank 230, as shown in FIG. 2D, using a mold 220 containing a sealant, such as an optically clear resin, which preferably has an index of refraction near or equal to the index of refraction of the lens blank.

The electro-active element 200 and the conductive bus 210 is placed in the mold 220 and capped with the lens blank 230. The resin may be cured by way of example only, by thermal energy, light energy, or a combination of the two. Light sources may include any one of or a combination of visible, ultraviolet or infrared sources.

Figure 2E:
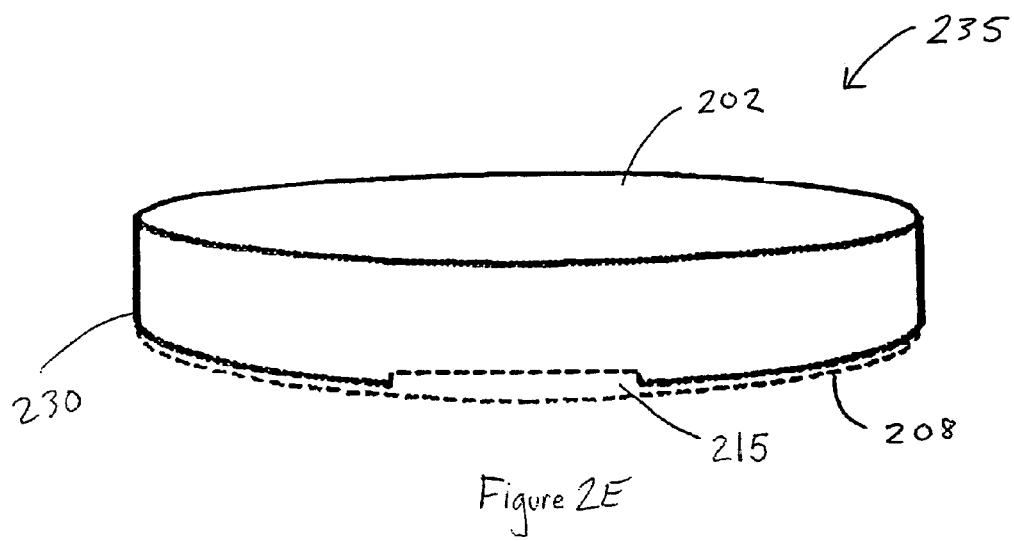

At step 140, the semi-finished blank 230 can be demolded as shown in FIG. 2E to provide a semi-finished electro-active lens blank 235. The cured resin creates a covering layer 215 over the front convex surface 204, which has the effect of burying the electro-active element 200 and conductive bus 210 within the electro-active lens. The electro-active lens blank 235 has a covering surface 208 having a radius of curvature equal to that of the mold 220. The radius of curvature of the covering surface 208 in combination with the radius of curvature of the back concave surface 202 provides the fixed optical power.

A hard, scratch-resistant coating may optionally be applied to the lens as shown in step 150. Hard coating may be accomplished by dipping or spin coating the lens prior to finishing the semi-finished electro-active lens blank 235. It should be appreciated that the hard coating may be applied to an inner surface of mold 220 before filling the mold with resin and curing the resin to the front convex surface 204 of the lens blank, such that when the resin has cured and the covering layer is formed, the hard coat is already on the covering surface 208.

Figure 2F:
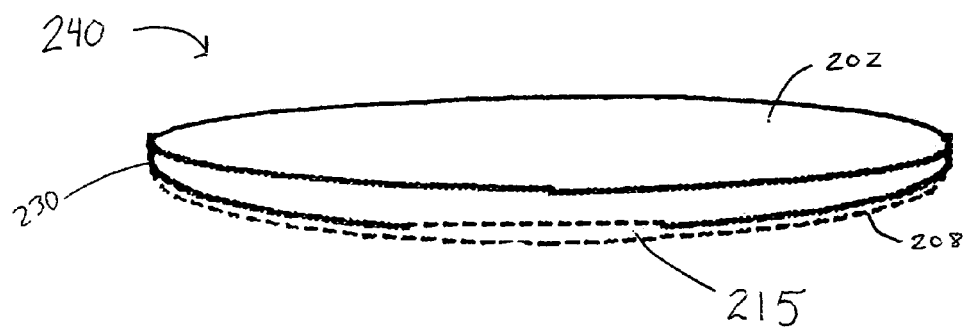

At step 160, the semi-finished electro-active lens blank 235 can be finished to a desired prescription, as shown in FIG. 2F, by surfacing the electro-active lens blank 235 by known techniques to produce an electro-active lens 240. The electro-active lens 240 may subsequently be edged to fit in a spectacles frame.

It should be appreciated that the front convex surface 204 and back concave surface 202 of the lens blank 230 may have any or no degree of curvature, which may later be applied through various surfacing techniques. Once the lens blank 230 has been conformally sealed to bury the electro-active element 200 and conductive bus 210, the final degree of curvature imparted to back concave surface 202 and the covering surface 208 after finishing, not the front convex surface 204, determines the optical characteristics of the electro-active lens 240.

Figure 6:
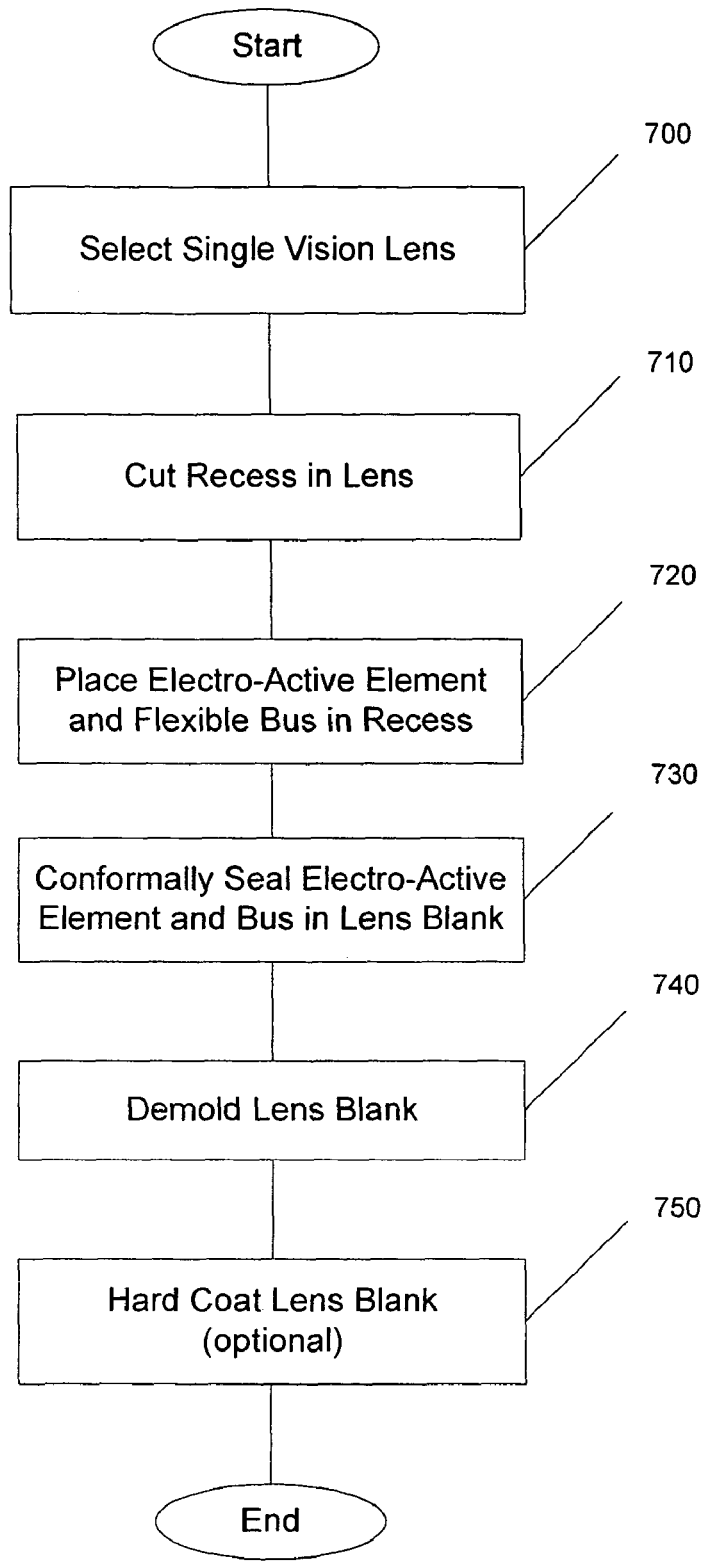
FIG. 6 is a flow chart of a method of manufacturing an electro-active lens according to yet another exemplary embodiment of the invention.

In an exemplary embodiment of the invention, the manufacturing of the electro-active lens uses a preformed optic such as, but not limited to a finished, or single vision lens, for example. FIG. 6 illustrates a method of manufacturing an electro-active lens from a lens blank which is a single vision lens using a conformal sealing approach similar to that described above in relation to FIG. 2 to create a covering layer to contain the electro-active element within the lens. However, unlike the semi-finished blank described with respect to the method in FIG. 2, a single vision lens already has a prescription and does not need further surfacing to provide the correct fixed optical power to a wearer of the lens. Accordingly, in this embodiment, the conformal sealing is preferably done in such a manner as to not change the power of the original finished lens. This may be accomplished, for example, by using a mold to produce a radius of curvature on the covering surface of the covering layer equal to that of the front convex surface of the single vision lens. However, it should be appreciated that even if a finished single vision lens is used, the optical power may be changed if desired by using a mold to produce a covering layer having a covering surface which has a desired curvature different from that of the front convex surface of the single vision lens.

Figure 6A:
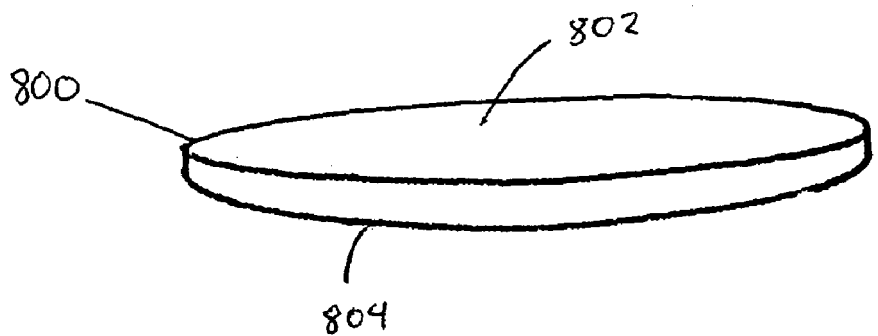
FIGS. 6A–6E illustrate a lens at various stages in the method shown in FIG. 6.
Figure 6B:
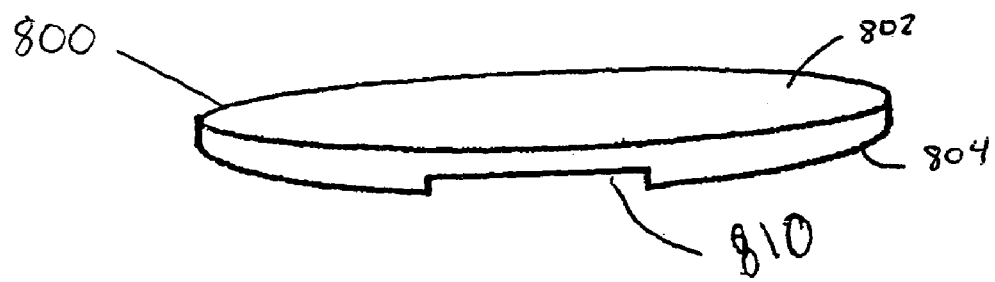
Figure 6C:
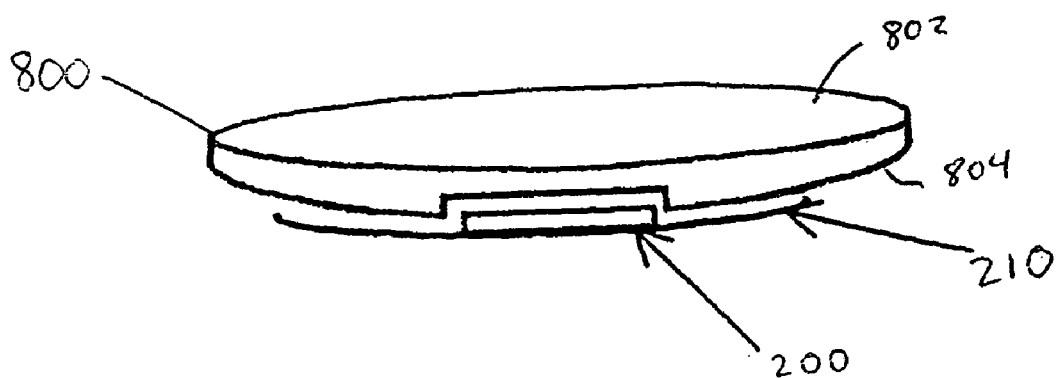
Figure 6D:
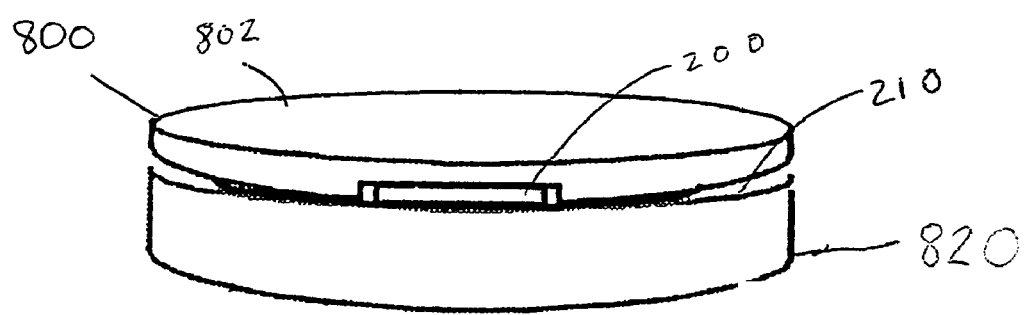
Figure 6E:
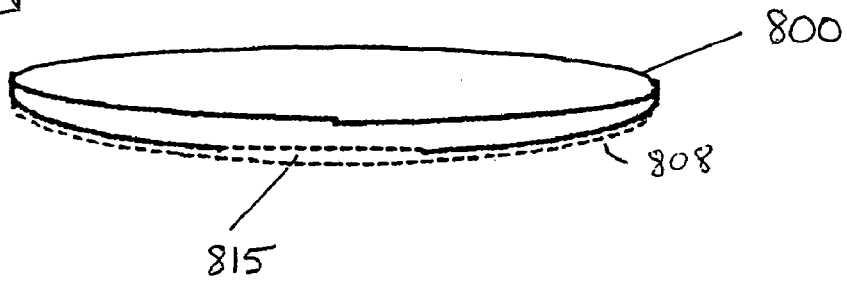

As shown in FIG. 6, at step 700, a single vision base lens 800 can be selected, as further shown in FIG. 6A. At step 710, a recess 810 may be cut into the front convex surface 804 of the single vision base lens 800 shown in FIG. 6B. Alternatively, the single vision base lens 800 may already have a recess 810, such as may have been formed in the single vision base lens 800 during its original manufacture. At step 720, an electro-active element 200 and conductive bus 210 may be placed in the recess 810 as shown in FIG. 6C. At step 730, the electro-active element 200 and bus 210 are conformally sealed using a resin-containing mold 820 as shown in FIG. 6D. At step 740, the mold 820 is removed and a hard coating may optionally be applied. In certain embodiments the hard coat is transferred from the mold during the conformal sealing. In this case the inner concave surface of the mold used to produce the convex covering surface 808 of the covering layer would have been pre-coated with a hard coat resin that is cured and transferred in the conformal sealing process. Because the single vision base lens described in this example may already be finished to have a desired fixed optical power prior to conformal sealing, the inner surface of the mold 820 is preferably concave with a radius of curvature equal to that of the front convex surface 804 of the single vision base lens 800. This yields a convex covering surface 808 upon removal of the single vision base lens 800 from the mold 820 after conformal sealing which is substantially identical in curvature to that of the front convex surface 804, as shown in FIG. 6E, resulting in little to no change in the fixed optical power of the single vision base lens 800.

Use of conformal sealing in the manufacture of an electro-active lens can reduce the number of stock-keeping-units (SKUs) to 539, a significant reduction compared to the number of SKUs commonly required for conventional lenses.

To understand the significance of this improvement, one must understand the number of traditional lens blanks needed to address most prescriptions. About 95% of corrective prescriptions include a sphere power correction within a range of −6.00 diopters to +6.00 diopters, in 0.25 diopter increments. Based on this range, there are about 49 commonly prescribed sphere powers. Of those prescriptions that include an astigmatism correction, about 90% fall within the range of −4.00 diopters to +4.00 diopters, in 0.25 diopter increments. Based on this range, there are about 33 commonly prescribed astigmatic (or cylinder) powers. Because astigmatism has an axis component, however, there are about 180 degrees of astigmatic axis orientations, which are typically prescribed in 1 degree increments. Thus, there are 180 different astigmatic axis prescriptions.

Moreover, many prescriptions include a bifocal component to correct for presbyopia. Of those prescriptions that have a presbyopic correction, about 95% fall within the range of +1.00 to +3.00 diopters, in 0.25 diopter increments, thereby resulting in about 9 commonly prescribed presbyopic powers.

This results in the possibility of 2,619,540 (49×33×180×9) different lens prescriptions, requiring a very large number of SKUs for a lens manufacturer. This large number of SKUs is further increased due to the variety of raw materials available for lens manufacturing as well as other special features available for inclusion in lens such as photochromic tints. By providing most vision correction electro-actively, the number of SKUs is greatly reduced.

In another exemplary embodiment of the invention, the electro-active lens is manufactured by attaching two lens wafers together, with an electro-active element sandwiched between the two lens wafers.

Figure 7:
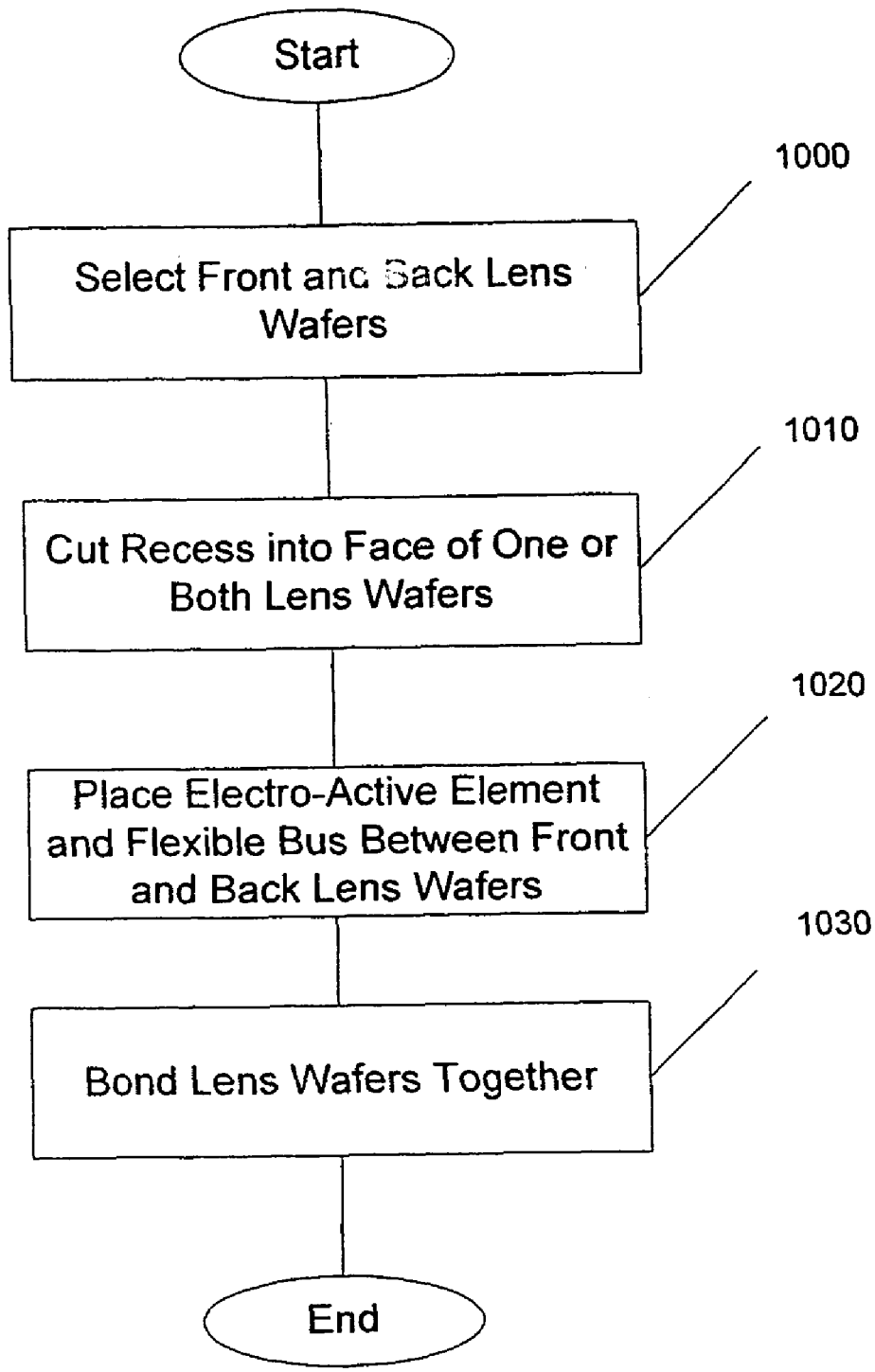
FIG. 7 is a flow chart of a method of manufacturing an electro-active lens according to an exemplary embodiment of the invention.
Figure 7A:
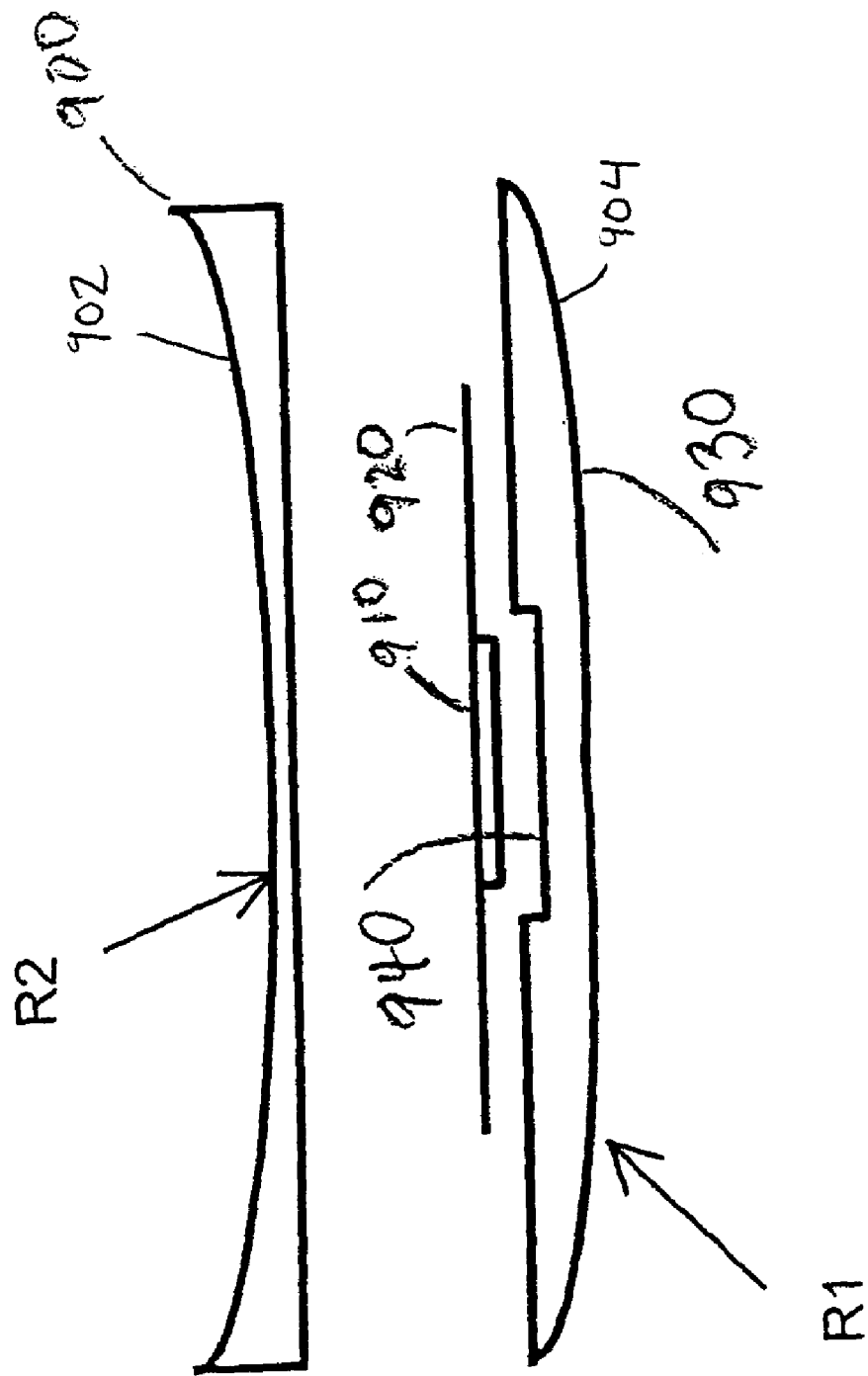
FIG. 7A illustrate an electro-active lens manufactured by the method described in FIG. 7.

As shown in FIG. 7, at step 1000, a front and back lens wafer may be selected to have the desired optical characteristics for the fixed distance refractive power to match a wearer's vision prescription. As shown in FIG. 7A, a concave back lens wafer 900 and a convex front lens wafer 930 are selected. The front lens wafer 930 may have a radius of curvature of R1, while the back lens wafer 900 may have a radius of curvature R2. The fixed optical power of the lens wafers equals $(n-1) \times (1/R1 - 1/R2)$, where "n" equals the index of refraction of the material used to manufacture the lens wafers. Where both R1 and R2 are parallel to one another, the resulting base lens formed by attaching the lens wafers has a fixed optical power of zero.

As with other the electro-active lenses described herein, optical power for near and intermediate vision correction results from the addition of the fixed optical power, which typically provides optical power to provide far distance vision correction, plus the optical power provided by viewing through an area of the electro-active lens containing the electro-active element. It should be appreciated, however, that any lens may be manufactured to have a fixed optical power which equals zero such that all vision correction is provided by viewing through the area of the electro-active lens containing the electro-active element. Likewise, viewing through the area of the lens containing the electro-active element may provide correction of non-conventional refractive error, including correction of higher order aberrations, for all focal lengths.

It should further be appreciated that through the use of customized casting, freeform manufacturing, or light initiated refractive index changes or light initiated refraction changes, it is possible to correct for non-conventional refractive error using the base lens only or in combination with the electro-active element. In these embodiments, the base lens may provide correction of non-conventional refractive error independent of the electro-active element, which may correct for spherical power adjustments or errors associated with conventional refractive error such as presbyopia.

Referring again to FIG. 7A, a recess may be cut into either one or both of the surface opposite the convex surface of the front lens wafer 930 and the surface opposite the concave side of the back lens wafer 900. Alternatively, a recess may already be present in the lens wafers 900, 930, having been previously created, such as at the time of manufacture. FIG. 7A illustrates the front lens wafer 930 having a single recess 940 in the surface opposite the convex surface of the front lens wafer 930. An electro-active element 910 and a flexible conductive bus 920 may be placed between the back lens wafer 900 and the front lens wafer 930, the electro-active element 910 and the flexible conductive bus 920 situated to fit within the recess 940. As described in step 1030, the front lens wafer 930 and the back lens wafer 900 may be bonded together with an index matched adhesive, to produce an electro-active lens.

In certain embodiments, the electro-active lens may be manufactured from laminated lens wafers, with the back lens wafer providing cylinder power and the combination of the back and front lens wafers completing the sphere power of the lens.

It should be appreciated that in certain embodiments in the manufacture of an electro-active lens, step 1010 as shown in FIG. 7 is optional and no recess is required for the conductive bus and electro-active element. For example, in certain embodiments an electro-active element and conductive bus may be sandwiched between two lens wafers, while maintaining the proper relationship of the two wafers so as not to create a prismatic power unless it is desired to address the particular vision needs of the wearer. An index matched ophthalmic grade resin may be applied between the layers and held in place by, way of example only, a peripheral gasket until cured, at which point the gasket could be removed resulting in an electro-active lens.

Figure 3:
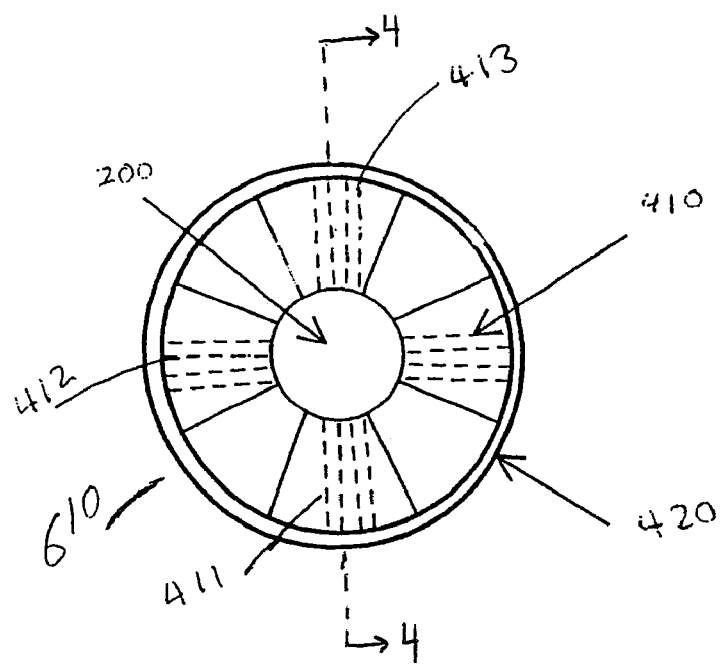
FIG. 3 illustrates a top view of a semi-finished fly-away mold gasket according to an exemplary embodiment of the invention.
Figure 4:
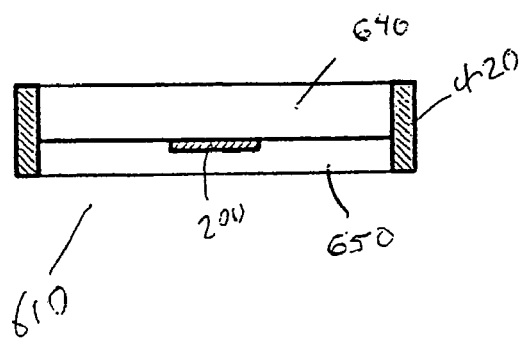
FIG. 4 illustrates a cross-section of the semi-finished fly-away mold gasket of FIG. 3.

In another exemplary embodiment of the invention, an electro-active lens can be manufactured by molding the entire lens around an electro-active element, which is disposed in the bulk of the final electro-active lens product. FIG. 3 illustrates a top view of a semi-finished fly-away mold gasket 610 holding an electro-active element 200 and buses 410–413. The electro-active element 200 may be electrically connected to four conductive buses 410, 411, 412, 413. The conductive buses 410, 411, 412, and 413 extend from the electro-active element 200 radially outward to a mold gasket ring 420. FIG. 4 illustrates a cross-sectional view of the semi-finished fly-away mold gasket of FIG. 3, including the electro-active element 200 and the buses 410–413.

Figure 5:
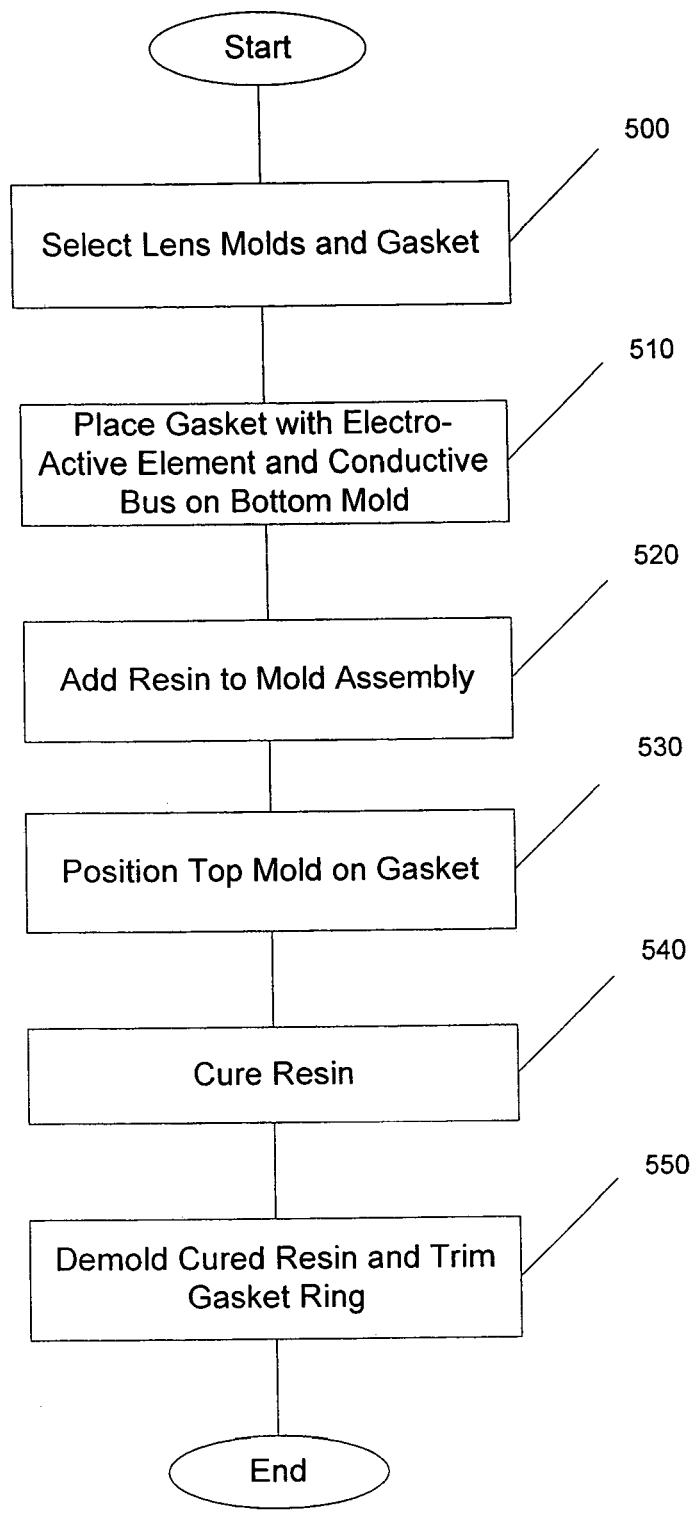
FIG. 5 is a flow chart of a method of manufacturing an electro-active lens according to another exemplary embodiment of the invention.
Figure 5A:
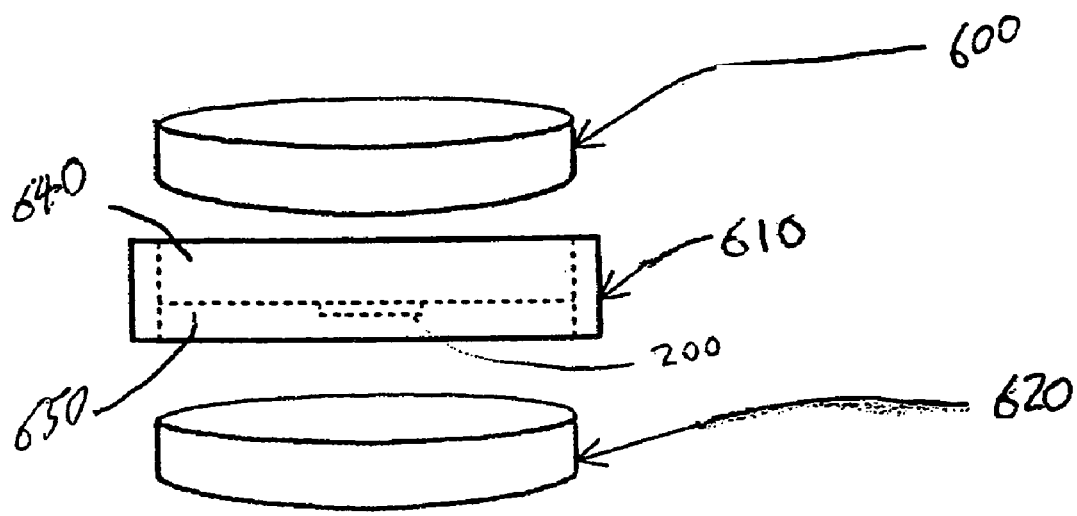
FIGS. 5A–5F illustrate a lens at various stages in the method shown in FIG. 5.
Figure 5B:
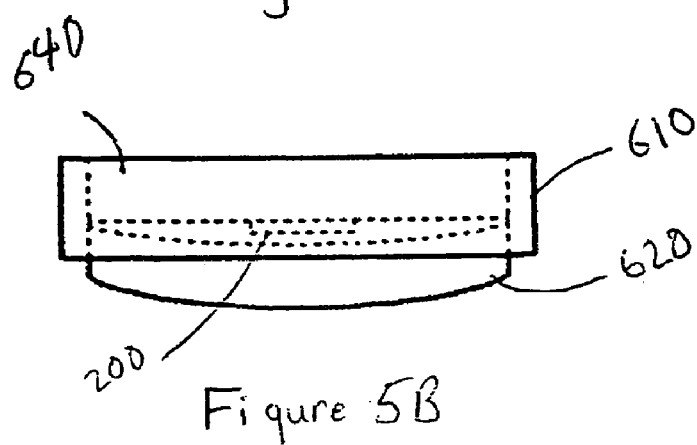
Figure 5C:
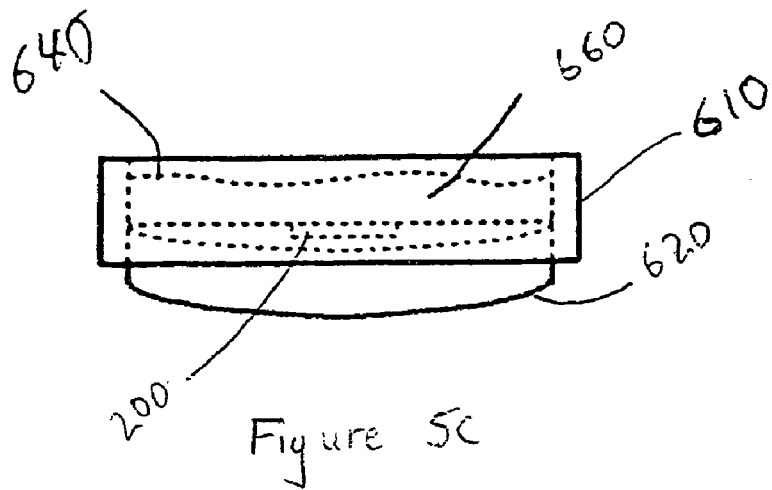

FIG. 5 illustrates a method of manufacture of electro-active lenses using a fully molded semi-finished blank according to an embodiment of the invention. At step 500, a mold assembly which includes a top mold 600 and a bottom mold 620, and a fly-away gasket 610 having a gasket top cavity 640, a gasket bottom cavity 650, an electro-active element and a conductive bus may be selected, as shown in FIG. 5A. At step 510, the gasket 610 may be placed on the bottom mold 620, as shown in FIG. 5B. At step 520, a resin 660 can be added to the mold assembly, which when cured, will form the lens. The resin passes into the gasket bottom cavity 650 through spaces between, or apertures in, the conductive buses. It should also be appreciated that the mold assembly shown in FIG. 5D could be filled with a resin through a sealable aperture in the side of the gasket 610.

Figure 5D:
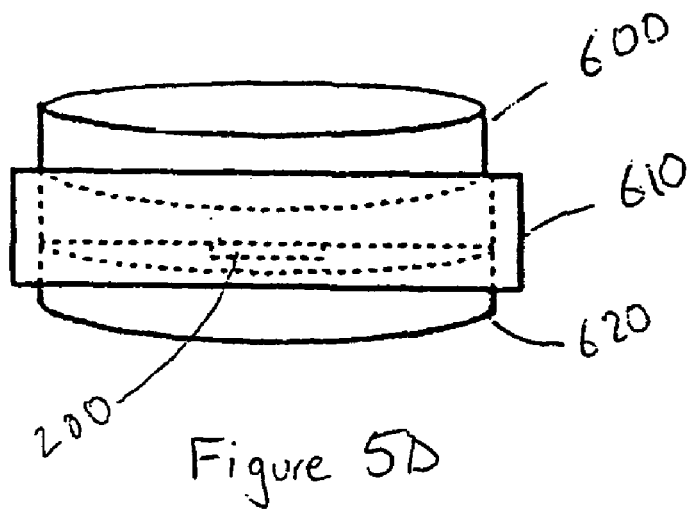
Figure 5E:
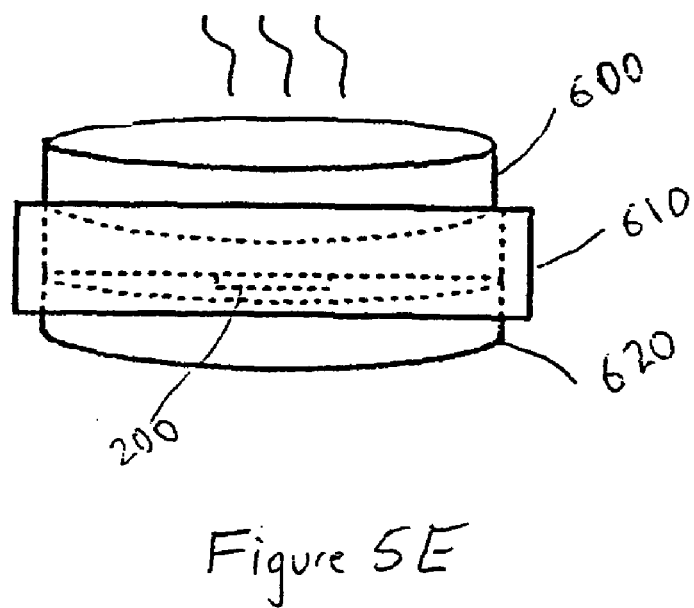
Figure 5F:
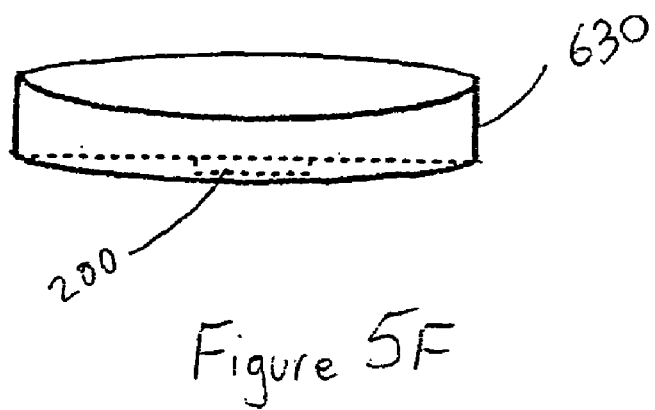

Ophthalmic grade resins such as those used in conformal sealing may be used. These resins include dietilenglycol bis allylcarbonate, such as CR39® available from PPG Industries, Inc. of Pittsburgh Pa., high index polymers and other well known ophthalmic resin materials. At step 530, the top mold 600 may be positioned over the gasket top cavity 640, as shown in FIG. 5D. The resin between the top mold 600 and bottom mold 620 is cured in step 540, as shown in FIG. 5E. At step 550, the top mold 600 and bottom mold 620 may be removed along with the outer gasket ring 420, to produce a semi-finished electro-active lens blank, which may then be subjected to various finishing techniques to produce the finished electro-active lens.

It should be appreciated that while this embodiment describes the molding process in terms of cast molding, injection molding may also be used in the manufacture of an electro-active lens. In these embodiments, a material such as polycarbonate, for example, may be injection molded into a die and cured around an electro-active element and conductive bus contained within the die to manufacture an electro-active lens.

Figure 8C:
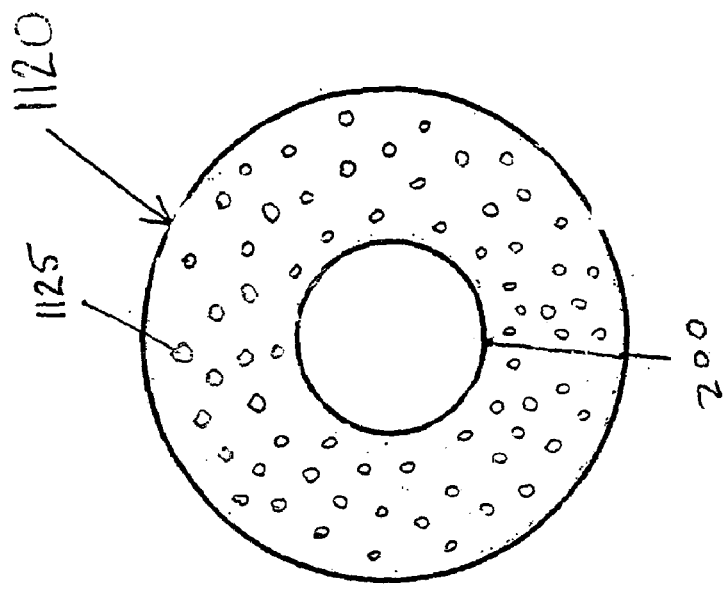
FIGS. 8A–8C illustrate conductive bus arrangements according to alternative embodiments of the invention.

Various conductive bus arrangements may be used to manufacture the electro-active lens of the exemplary embodiments of the invention. Typically, a bus or group of buses may be placed in any manner to conduct electricity radially outward from the electro-active element. As shown in FIG. 8A, the electro-active element 200 may be electrically connected to a single conductive bus 1100. The bus 1100 extends radially outward from the electro-active element 200. When the bus extends outward from the electro-active element it may also be utilized as an electrical lead to connect a power source directly or indirectly to the electro-active element 200.

Figure 8B:
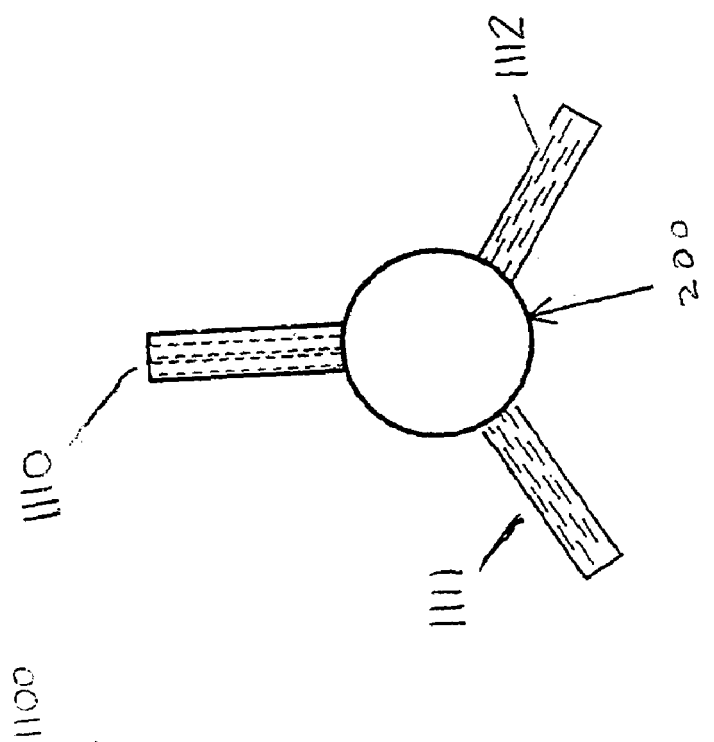
Figure 8A:
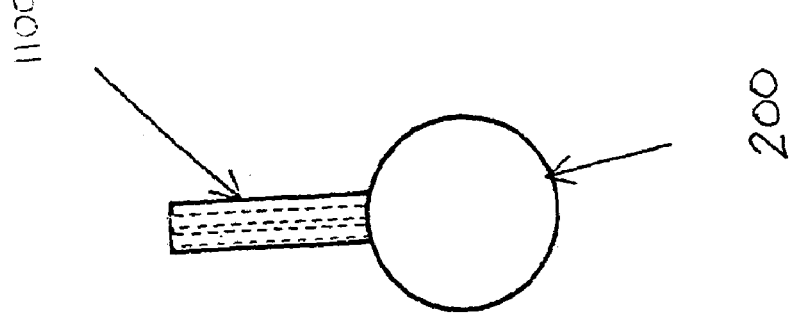

In another embodiment, as shown in FIG. 8B, the electro-active element 200 may be electrically connected to a plurality of conductive buses, such as conductive buses 1110, 1111, 1112. As with the single conductive bus of FIG. 7A, each of buses 1110, 1111, 1112 may be electrically connected at one end to the electro-active element 200 and may extend radially outward from the electro-active element 200. Preferably, each of buses 1110, 1111, 1112 are spaced evenly around the electro-active element 200. It should be appreciated that any number of buses may be arranged to extend outward from the electro-active element 200 in a full or partial wagon-wheel configuration. Increasing the number of buses includes an advantage of providing a larger number of positions at which electronic components such as a rangefinder, controller, and power supply may be placed to activate the electro-active element and provide electro-active vision correction.

In yet another embodiment, as shown in FIG. 8C, the electro-active element 200 may be electrically connected to a disk shaped conductive bus 1120 that at least partially encircles the electro-active optical element 200. The conductive bus 1120 may comprise a plurality of perforations or apertures 1125. These perforations 1125 may be advantageous to allow resin to flow through and around the conductive bus 1120 lock the electro-active element 200 into the lens blank during manufacturing of the electro-active lens and may enhance bonding between the conductive bus 1120 and lens wafers, if the electro-active lens is manufactured with the use of lens wafers. The conductive bus 1120 is electrically connected at the inner periphery of the disk to the electro-active optical element 200.

Figure 9A:
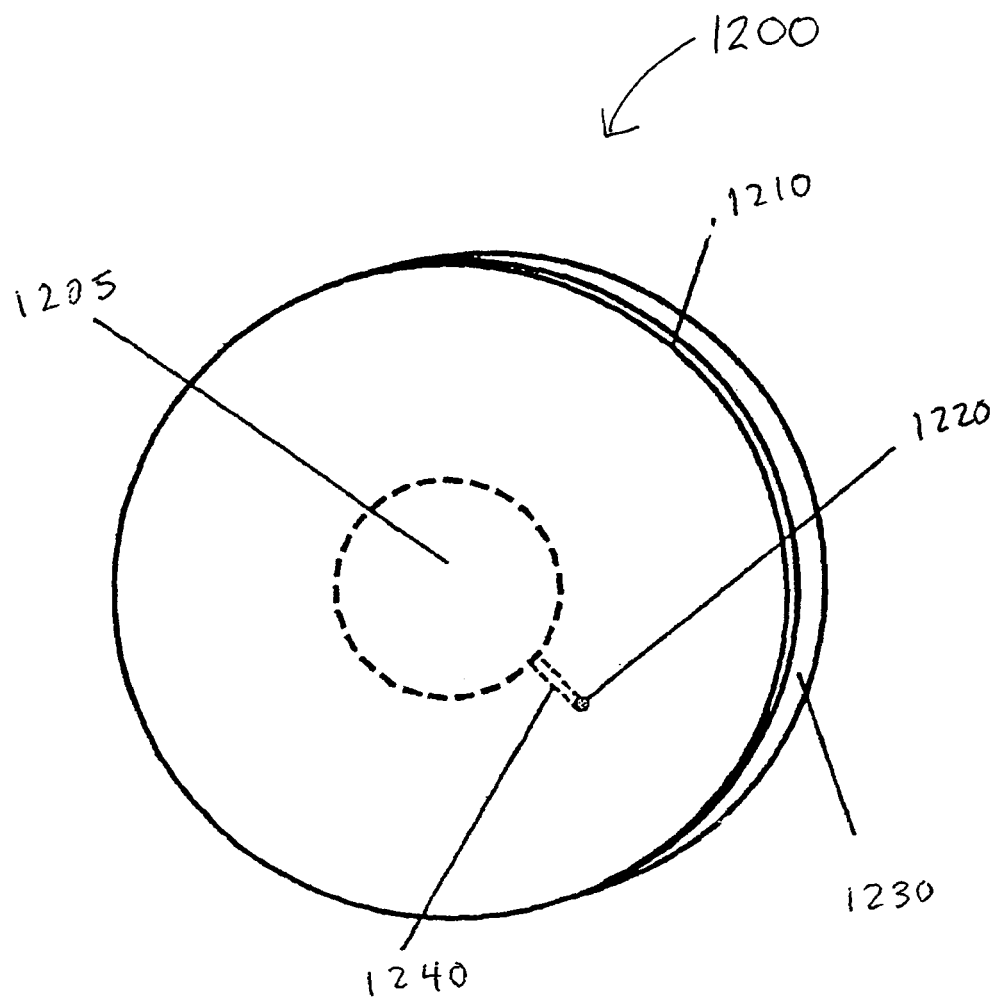
FIGS. 9A–9C illustrate an exemplary embodiment of an electro-active lens having conductive bus arrangements.

FIG. 9A illustrates an electro-active lens 1200 having a conductive bus arrangement connected to a rangefinder and controller. The conductive bus arrangement comprises an electro-active element 1205, an electro-active substrate wafer 1210, an integrated controller/rangefinder 1220, a base lens 1230 and drive signal buses 1240.

The rangefinder may comprise a transmitter and detector coupled to a controller. In another embodiment, a single device can be fabricated to act in dual mode as both a transmitter and detector connected to the controller.

The controller may be a processor, microprocessor, integrated circuit, or chip that contains at least one memory component. The controller stores information such as a vision prescription that may include the wearer's prescription for several different viewing distances. The controller may be a component of, or integral with, the rangefinder. It should be appreciated, however, that the controller and rangefinder may be separate components and need not be located at identical locations, only that the controller and rangefinder be electrically connected. It should also be appreciated that other view detectors, such as a micro tilt switch to determine a wearer's head tilt or an eyetracker to determine a wearer's line of vision could be used in lieu of, or in combination with, the rangefinder to determine what object a wearer is viewing and how the electro-active element should be activated to provide a focal length corresponding to the object being viewed to provide the wearer with proper vision correction.

The rangefinder is in electronic communication with the electro-active element, either directly or via the controller, through signals distributed through the conductive bus. When the rangefinder detects that the focal length produced by the electro-active element should be switched to provide a different focal length, the rangefinder may electronically signal the controller. In response to this signal, the controller adjusts the voltage applied to the electro-active element to produce a refractive index change that by itself, or in combination with other refractive index changes such as provided by the fixed optical power of the base lens will provide the desired vision correction. This refractive index change may be used to correct for conventional refractive error, unconventional refractive error when the refractive index change is generated in a prescribed pattern using a pixilated electro-active element, or a combination of both conventional and non-conventional error correction, either or both of which are consistent with a vision prescription stored in the memory of the controller. The new index of refraction produces the appropriate optical power in the electro-active lens to correspond to the change in focal length.

In the case where non-conventional refractive error is corrected only by the electro-active element and not through the use of free form lens techniques, a pixilated electro-active element is used. Non-conventional refractive error may be corrected by applying a voltage to the electro-active element, which creates a refractive index change to a plurality of pixels, contained within the electro-active element thus creating a grid or pattern having a variety of indices of refraction which in combination provide for the correction of non-conventional refractive error.

The rangefinder may use various sources such as lasers, light emitting diodes, radio-frequency waves, microwaves, or ultrasonic impulses to locate the object and determine its distance. The light transmitter may be a vertical cavity surface-emitting laser (VCSEL) is used as the light transmitter. The small size and flat profile of these devices make them attractive for this application. In another embodiment, an organic light emitting diode, or OLED, is used as the light source for the rangefinder. The advantage of this device is that OLEDs can often be fabricated in a way that they are mostly transparent. Thus, an OLED may be a preferable rangefinder to keep the lens aesthetically pleasing, since it could be incorporated into the lens or frames without being noticeable.

Figure 9B:
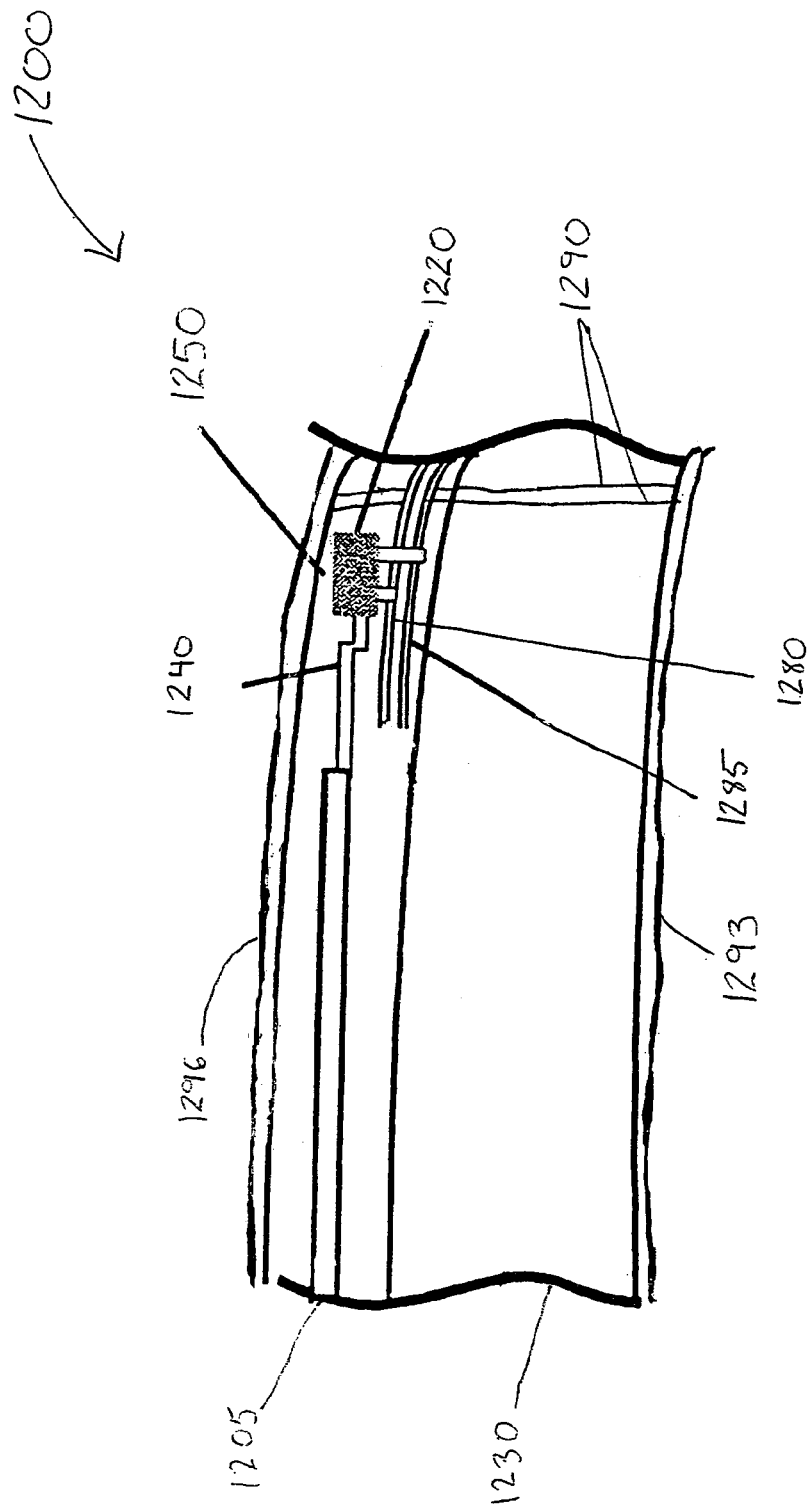

Referring to FIG. 9B, which is a cross-sectional view from the top of the lens shown in FIG. 9A, the controller/rangefinder 1220 may be contained within an electro-active substrate 1250 that may be further processed to produce an electro-active lens. Vias 1290 may be used to provide electrical connection to circuitry buried in the base lens 1230. The outer surface of the base lens 1230 may then be coated with transparent conductors 1293, 1296 which can be used to make electrical contact with a positive and negative terminal of an external power source, so that power can be applied to the electro-active element 1205 and the controller/rangefinder 1220 by applying a potential across the two exterior surfaces of the lens.

The controller/rangefinder 1220 may be connected to the electro-active element 1205 by a series of conductive buses, such as in any of the configurations described herein. Preferably, the bus may be of a wagon wheel construction where the buses form spokes of the wheel, with the electro-active element serving as the hub. The wagon wheel construction provides the option of the controller/rangefinder 1220 being mounted on the lens 1200 in a number of different locations. The controller/rangefinder 1220 may be connected at any point on any conductive bus 1240 and is preferably at a periphery of the lens near the frame, or the controller/rangefinder 1220 alternatively may be attached to the frame, connected to the conductive bus 1240 via leads. This wagon-wheel conductive bus configuration also provides multiple locations to apply a voltage across the electro-active element 1205 from a power source.

Figure 9C:
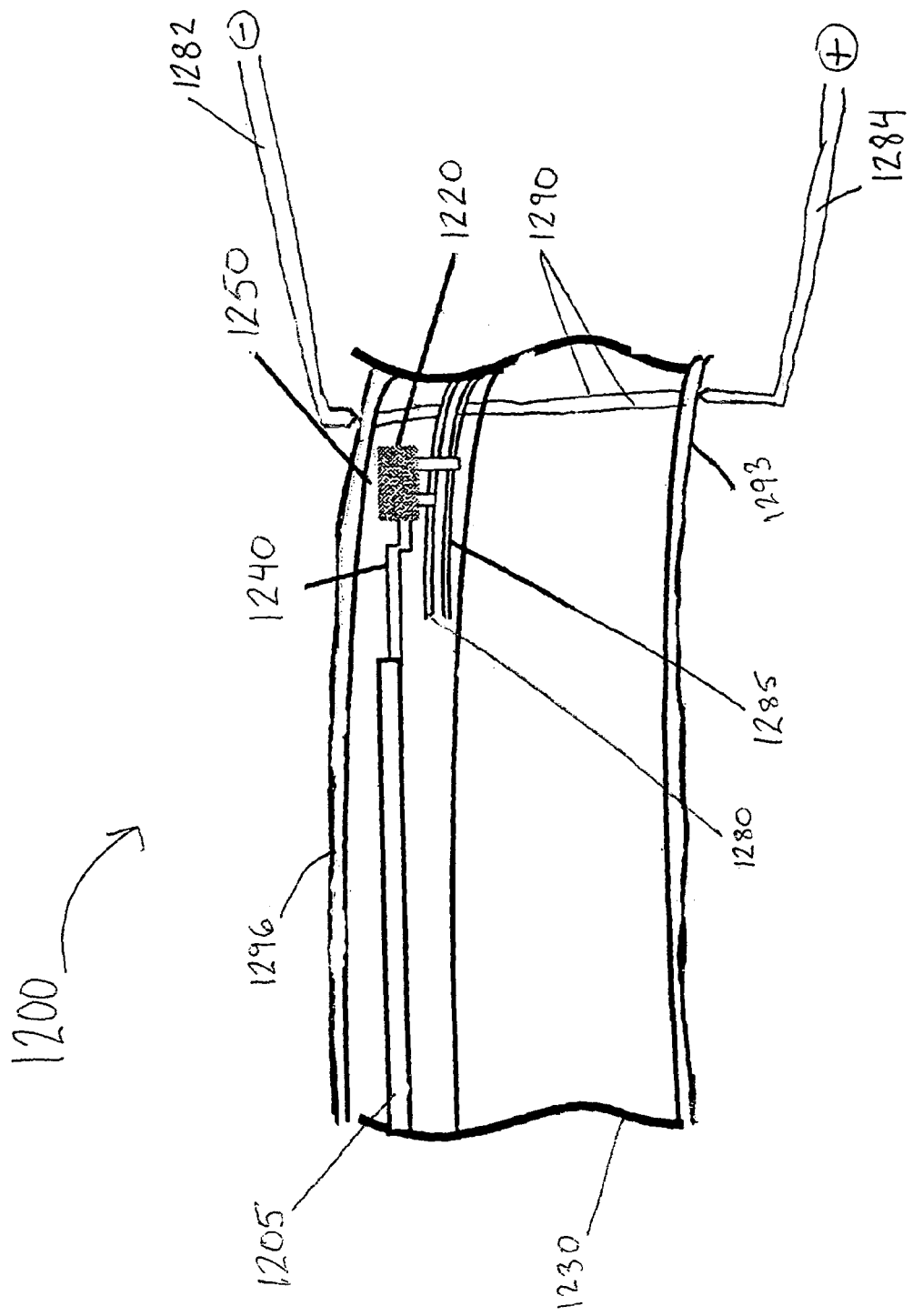
Figure 11A:
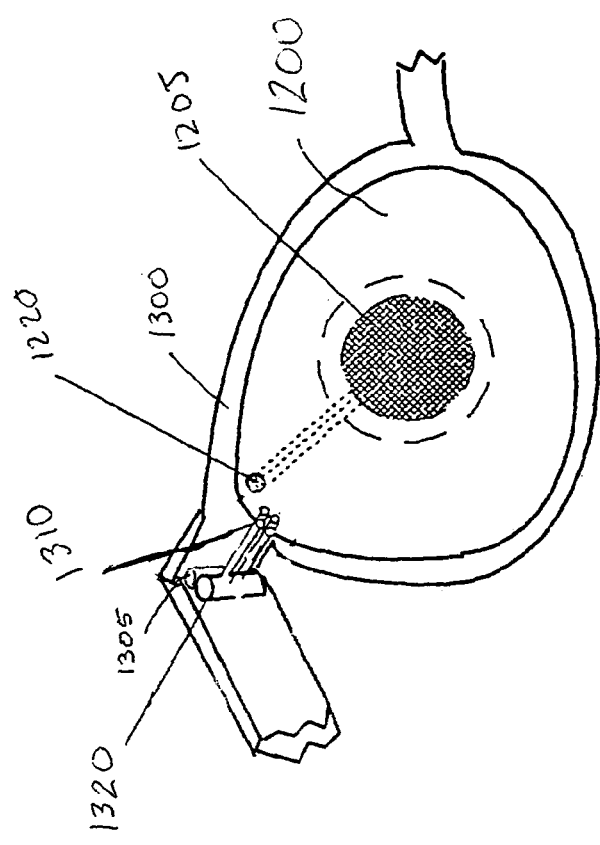
FIGS. 11A and 11B illustrate an alternative embodiment of the spectacles frame of FIGS. 10A and 10B having an electro-active lens manufacture according to an exemplary embodiment of the invention.
Figure 11B:
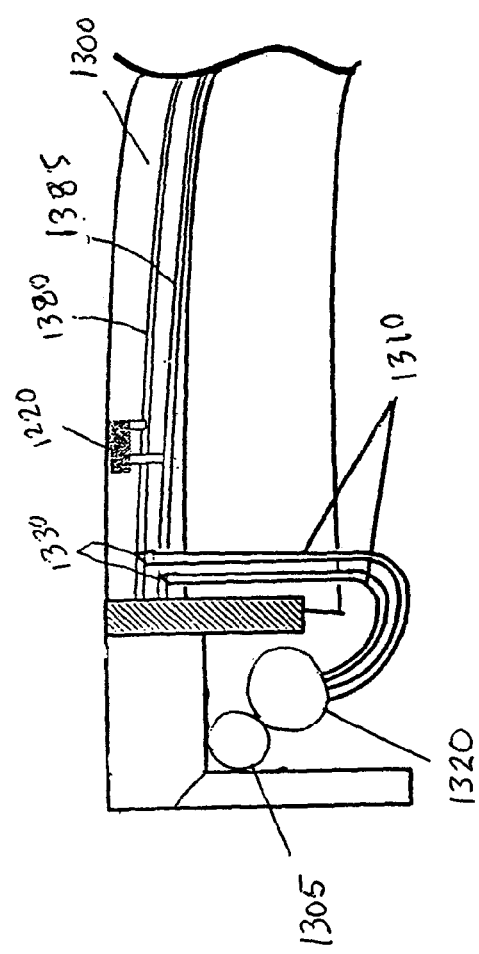

Alternatively, in certain embodiments an electrical conducting surface may be used as shown in FIG. 9C. In these embodiments a conducting penetrating mechanism, such as a clamp having a first jaw 1282 and a second jaw 1284 may be used, each jaw attached to opposite terminals of a power source. The jaws 1282, 1284 may be tightened such that a portion of the jaws may penetrate the surface of the lens 1200 or otherwise make contact with the surface of transparent conductors 1293, 1296 and thus conducting electrical power from the power source. In FIG. 9C, the connective jaws 1282, 1284 are shown on opposite sides of the lens. However, it should be appreciated that both jaws 1282, 1284 may penetrate the same side of the lens, provided that the proper insulation separates the positive and negative leads.

In yet another embodiment of the invention, the contacts to a power supply, such as a battery, may be mounted on or near a frame hinge 1305 of a spectacle lens which may contain an electro-active lens 1200 manufactured in accordance with the methods described herein. FIG. 10A illustrates a rear view of a spectacles frame with the contacts to the power supply mounted on or near the hinge of the frame according to an exemplary embodiment the invention. FIG. 10B illustrates a top view of a spectacles frame with the contacts to the battery mounted on or near the frame hinge according to an exemplary embodiment the invention. In some embodiments, the power supply, such as a battery 1320, may be connected to the lens through the front of the lens by drilling holes 1330 to the power terminals 1380, 1385 in the lens.

In some embodiments, the controller/rangefinder 1220 is mounted in the lens 1200 and the power to the controller/rangefinder 1220 and the electro-active element 1205 is supplied by a battery 1320 attached to the frame 1300. FIGS. 10A and 10B illustrate an embodiment in which the contacts 1310 to the battery 1320 are mounted on or near the frame hinge 1305, for example on the temple area of the frame. Alternatively, as shown in FIGS. 1A and 1B, the contacts 1310 to the battery 1320 can also be made though the back of the lens 1200. The contacts 1310 may be made from transparent, conductive materials such as ITO or other conductive oxides or with a transparent conductive polymer.

Figure 12A:
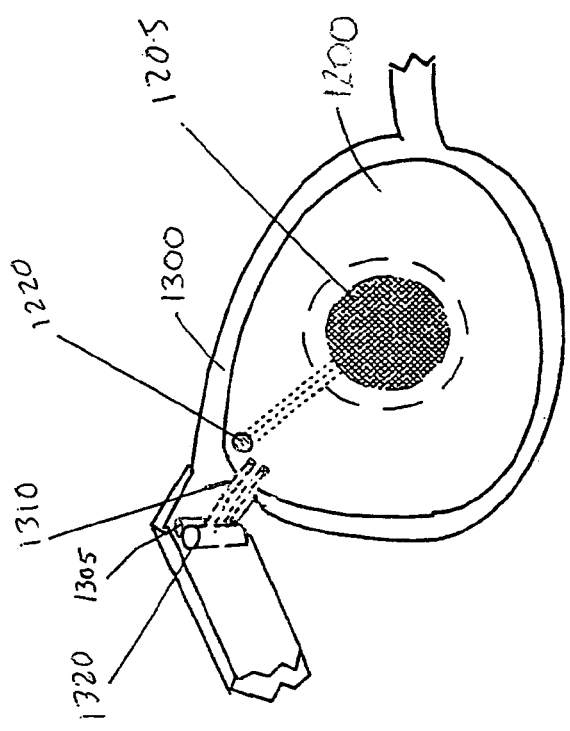
FIGS. 12A and 12B illustrate an alternative embodiment of the spectacles frame of FIGS. 10A and 10B having an electro-active lens manufacture according to an exemplary embodiment of the invention.
Figure 12B:
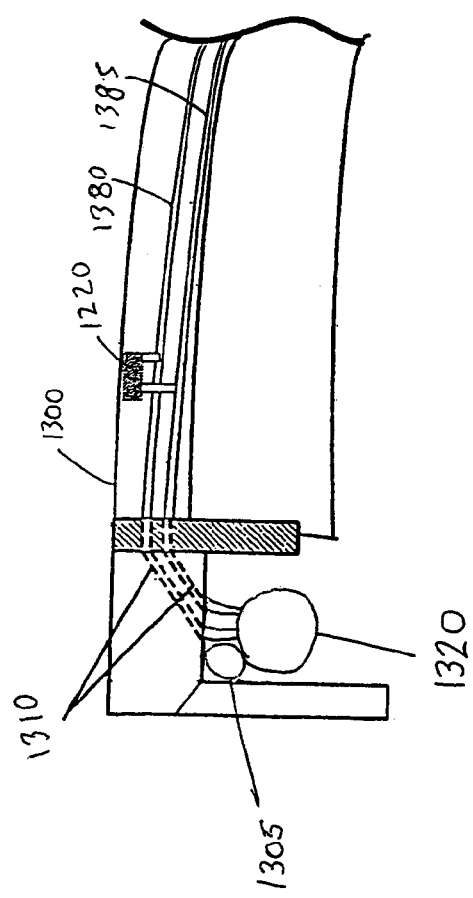

FIGS. 12A and 12B illustrate an alternative embodiment of the contacts 1310 to the battery 1320 mounted on or near the frame hinge 1305. The contacts 1310 may extend through the side of the frame 1300 into the side of the lens 1200. In such cases it may be advantageous to coat the outer edge of the lens 1200 with two conductive strips that are electrically isolated from one another to impede the current being supplied to the device. These conductive strips may provide better surface contact and reduced impedance for the voltage being supplied to the electro-active element 1205.

It is also possible to use a screw and frame hinge to mount an external power supply to the frame. In some embodiments the controller may also be mounted to the frame in this manner. FIGS. 13A–13D illustrate a battery attachment mounted on the frame hinge. The battery attachment comprises a battery 1320 with an attached support ring 1420, a frame screw 1410, and frame hinge 1305. The battery support ring 1420 may be inserted in the frame hinge 1305 to receive the screw 1410. The screw 1410 may be inserted through the frame hinge 1305, which may be threaded to hold the screw 1410. FIG. 13D shows an alternative embodiment in which the battery attachment may further comprise a battery cradle 1322 from which battery 1320 may be removed or replaced without disengaging the screw 1410 from the battery support ring 1420.

Figure 14:
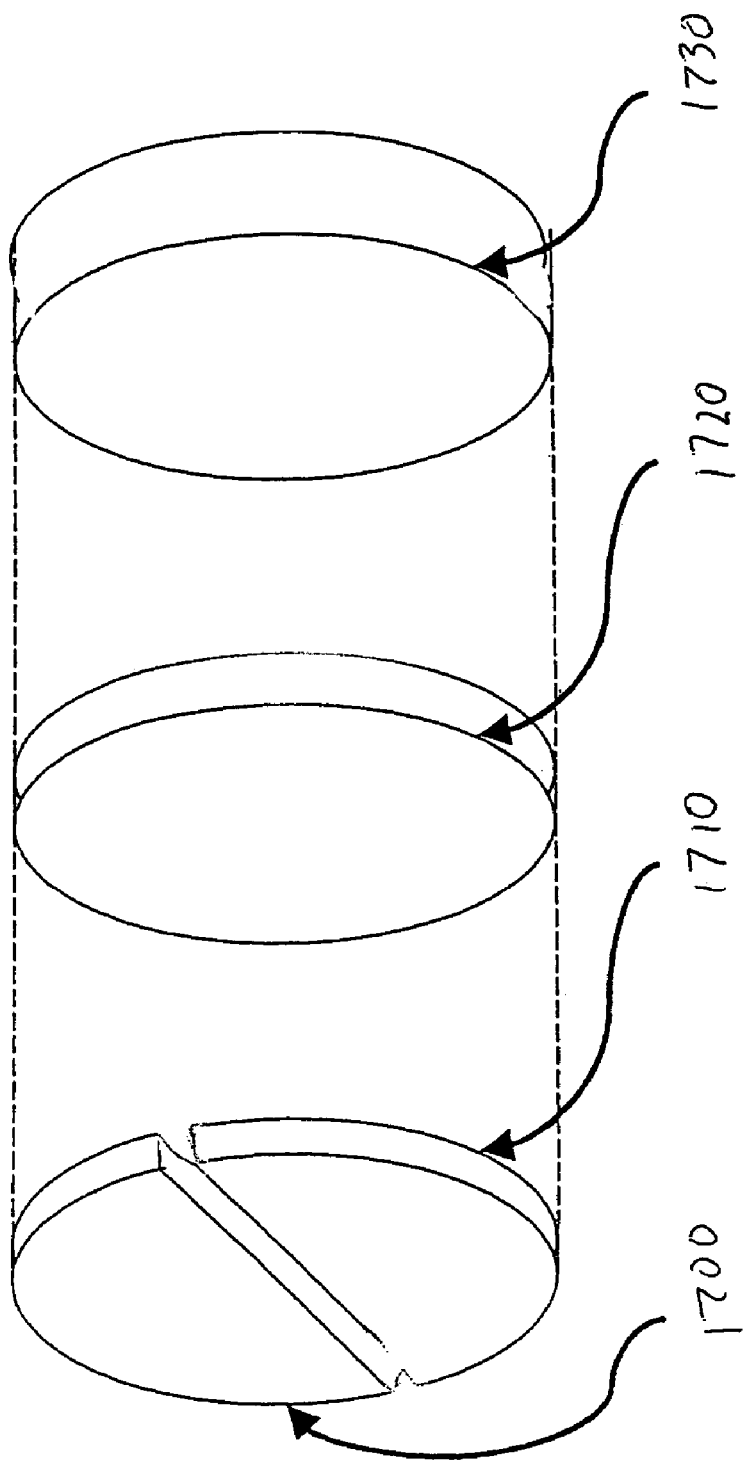
FIG. 14 illustrates integrated electrical components for use in manufacturing an electro-active lens according to an exemplary embodiment of the invention.
Figure 15:
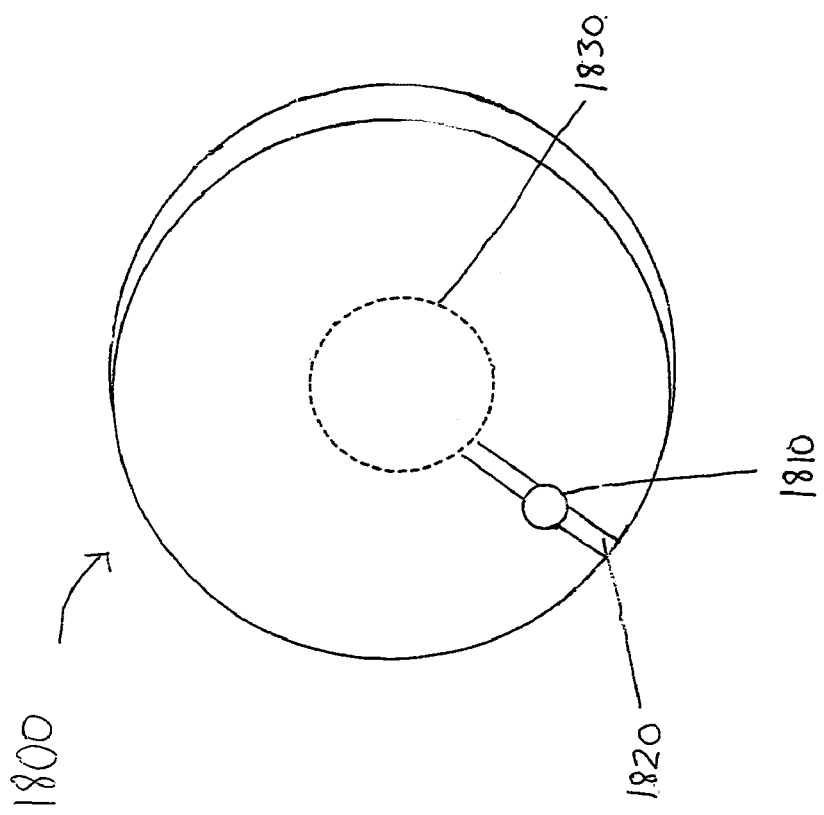
FIG. 15 illustrates another embodiment of integrated electrical components for use in manufacturing an electro-active lens according to an exemplary embodiment of the invention.

The controller, rangefinder, and power supply of the electro-active lens may be separate components placed on the lens or spectacle frame or they may be integrated into a single module. FIG. 14 illustrates an integrated battery, controller, and rangefinder which form a single control module for use in accordance with exemplary embodiments of the invention. The control module may comprise, by way of example only, a semi-circular photo-detector 1700 and a semi-circular light emitting diode 1710 which together form the rangefinder as a first component of the module. A controller 1720 may be positioned behind the rangefinder to form a second component, and a disk-shaped battery 1730 may be placed behind the controller 1720. As shown in FIG. 15, these components form a single control module 1810 which can be attached to the electro-active element 1830 via a conductive bus 1820 to provide power to the electro-active element 1830 and to switch focal lengths of the lens 1800 to provide the required vision correction for wearer of the lens.

Figure 16:
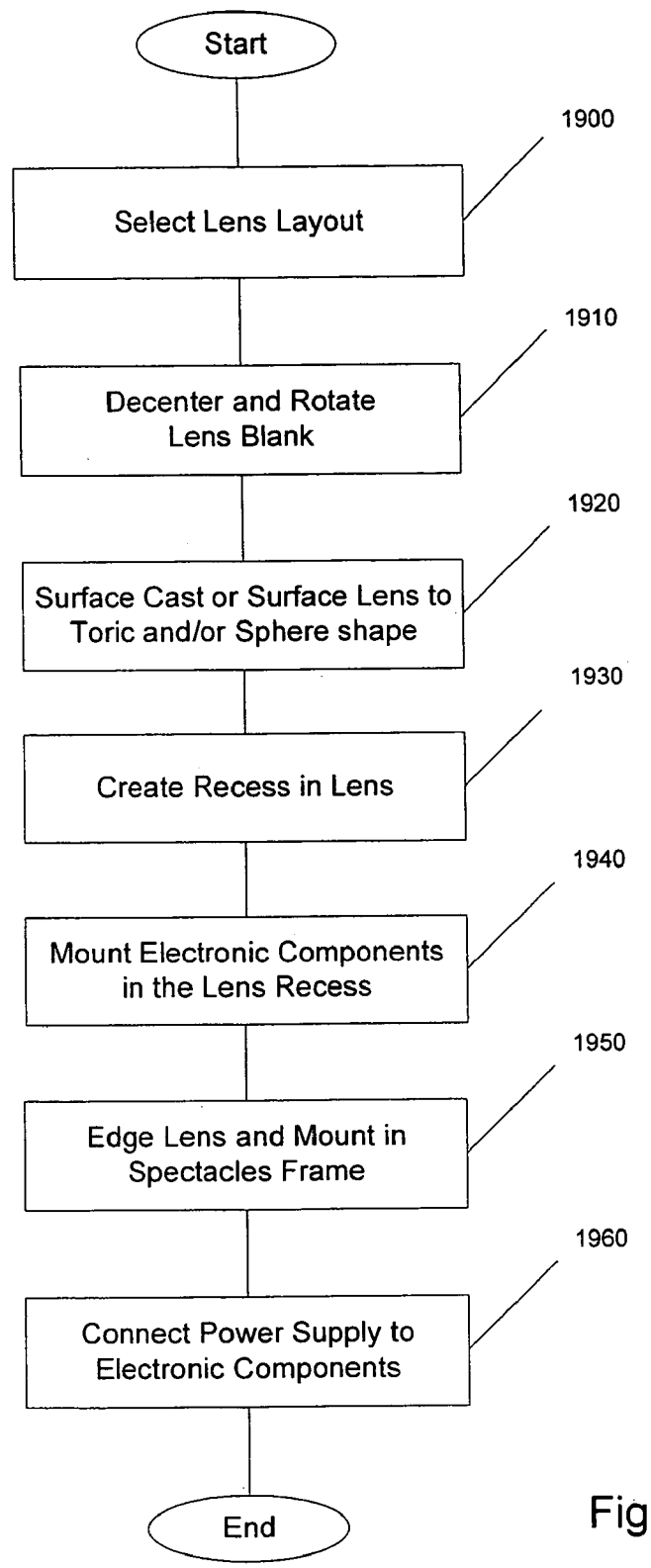
FIG. 16 is a flow chart of a method of finishing and mounting integrated electronic components in manufacturing an electro-active lens according to still another exemplary embodiment of the invention.
Figure 16B:
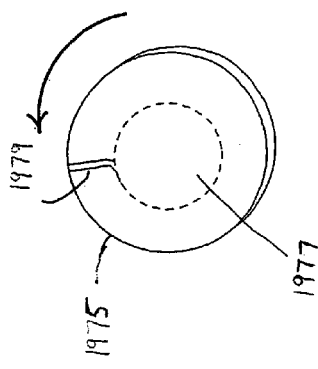
FIGS. 16A–16E illustrate a lens at various stages in the method shown in FIG. 16.
Figure 16C:
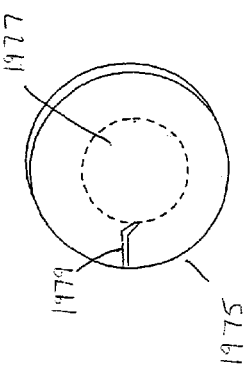
Figure 16E:
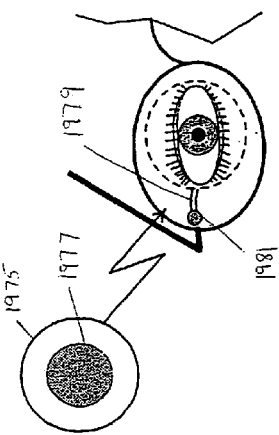
Figure 16A:
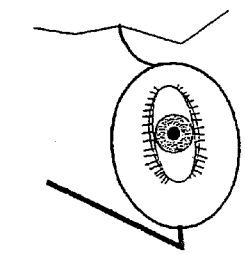
Figure 16D:
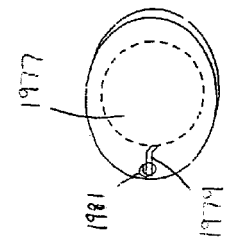

FIG. 16 illustrates a method of finishing and mounting an integrated control module into the lens. At step 1900, a layout may be selected for a desired spectacle frame taking into consideration the lens blank size and also the location of the wearer's pupils and the distance between them. At step 1910, a lens blank 1975, which may typically be a preformed optic or semi-finished blank may be decentered based on the size of the lens blank and the wearer's pupil alignment. In some cases, decentering may also be desired to produce a desired prismatic effect. The lens blank may also be rotated if an astigmatic correction is provided by the non-electro-active portion of the lens. At step 1920, the lens blank 1975 may be surface cast or ground to provide a needed distance prescription for the wearer. At step 1930, a recess may be cut or molded into the surface for receiving the electro-active element 1977 and conductive bus 1979. It should be appreciated that step 1930 is optional, and that a recess may previously have been created. At step 1940 the electro-active element and conductive bus, as well as a controller/rangefinder 1981 are inserted within the recess and conformally sealed to bury these components within the lens. The bus may preferably be oriented in a location that the rangefinder and controller can be placed near the edge of the spectacles frame, preferably near the temple of a wearer.

However, it should be appreciated, that as with other embodiments, the controller and rangefinder need not be buried within the lens, but that either one or both may later be added, such as by placement on a spectacles frame, or on the lens surface, and then electrically connected to the conductive bus contained within the lens. At step 1950 the lens is edged into a shape for placement within a spectacles frame and then mounted within that frame. When edging the lens to the fit the spectacle frame, the lens should be edged to remove only those portions of the lens which do not contain the electro-active element. Finally, at step 1960 the battery is connected to the conductive bus. If the controller was not preprogrammed prior to installation, it may be programmed to contain information particular to the wearer, such as the wearer's vision prescription for different focal lengths.

Figure 17:
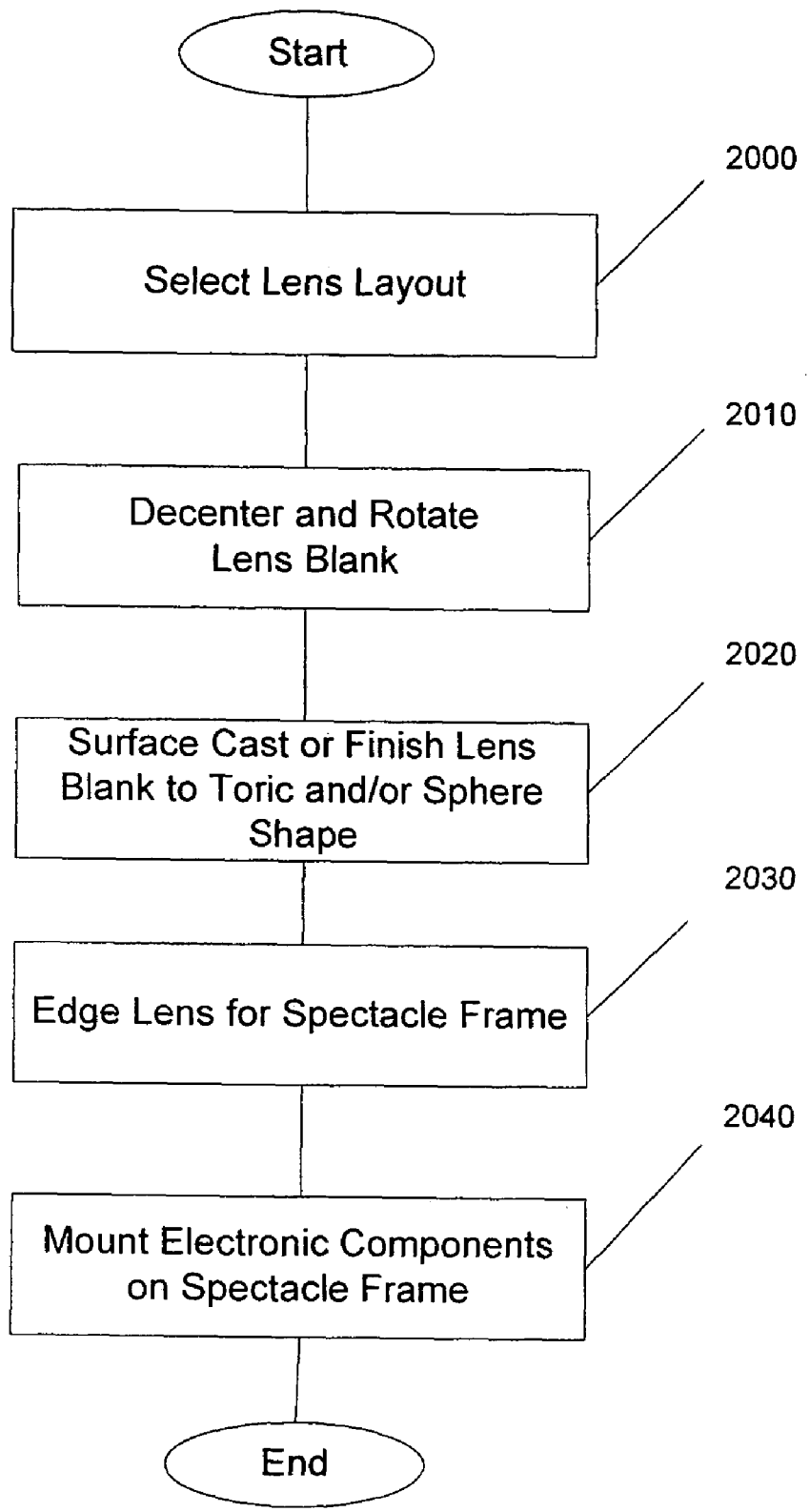
FIG. 17 is a flow chart of a method of finishing a lens with electronic components in manufacturing an electro-active lens according to another exemplary embodiment of the invention.
Figure 17B:
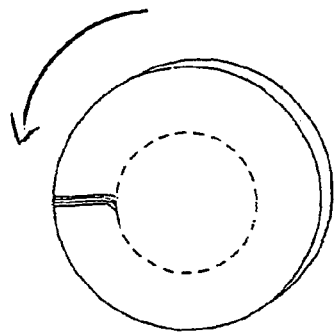
FIGS. 17A–17E illustrate a lens at various stages in the method shown in FIG. 17.
Figure 17E:
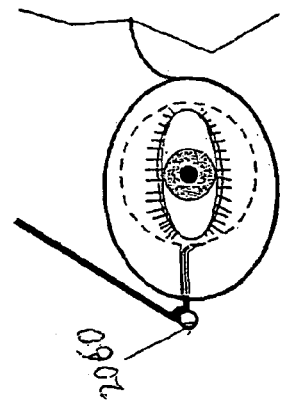
Figure 17A:
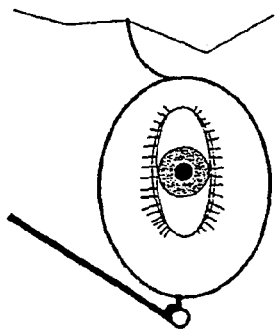
Figure 17D:
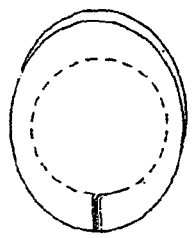
Figure 17C:
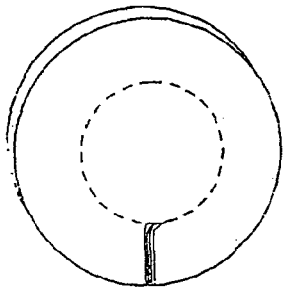

Alternatively, any one or all of the rangefinder, controller, and battery may be mounted on the spectacles frame and connected to the electro-active lens through leads passing to the electro-active element. FIG. 17 illustrates a method of finishing and dispensing a lens with a rangefinder, battery, and a controller in the spectacles frame. At step 2000, a layout may be selected. At step 2010, a preformed optic or a semi-finished blank can be decentered and rotated as shown in FIG. 17b. If the lens has a toric power and the electro-active element is placed over the optical center of the lens, the bus must be oriented relative to the toric axis. At step 2020, the lens may be ground to a toric and sphere shape, as illustrated in FIG. 17C. The lens may be edged, as in step 2030, for placement in a spectacle frame shown in FIG. 17D. At step 2040, the rangefinder, battery, and controller, shown as an integrated control module 2060, may be mounted on the spectacles frame, to complete the process as shown in FIG. 17E. Alternatively, it should be appreciated that the integrated control module may be mounted on the spectacles frame during frame manufacture.

If required for the wearer's vision needs, prism may be added during the various embodiments of manufacturing an electro-active lens. For example, if a semi-finished blank is used, prism may be added and surfaced into the lens as required by the vision prescription or in some cases the prism can be created by the decentration of the lens relative to the wearer's inter-pupillary distance.

Similarly, other methods of modifying the electro-active lens during manufacture may be achieved such as by tinting the lens after surfacing, but preferably prior to hard coating. The lens can be also made photo-chromic by conformally coating the lens with a photo-chromic layer or a material that is easily imbibed with a photo-chromic dye. Alternatively, the tint may be produced by an electro-chromic tint created by the electro-active element or by adding additional layers of electro-active material to the electro-active element.

An optional anti-reflective coating may applied to the lens, either before or after edging. To avoid out-gassing which may occur during application of the anti-reflective coating, the electro-active element should be completely sealed within the lens.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method of manufacturing an electro-active lens comprising:
   providing an electro-active element; and
   covering an exposed surface of the electro-active element to produce an electro-active lens;
   wherein the electro-active element comprises a plurality of pixels; and
   wherein the electro-active lens is capable of focusing an image from ambient light;
   wherein the electro-active element is connected to a power source; and
   wherein the power source is connected to a hinge screw of a spectacle frame.

2. A method as in claim 1, wherein the exposed surface of the electro-active element is covered by a lens blank; and
   wherein the lens blank is selected from the group consisting of a semi-finished blank, an unfinished lens blank, a lens wafer, a preformed optic and a finished lens blank.

3. A method as in claim 2, further comprising the forming of a recess in the front or back surface of the lens blank for receiving the electro-active element which is placed on the lens blank.

4. The method of claim 3 wherein the recess is formed by one of machining or molding the surface of the lens blank.

5. A method as in claim 1, wherein the electro-active element is connected to an electrical bus.

6. A method as in claim 5, wherein the bus is flexible.

7. A method as in claim 5, wherein the bus at least partially encircles the electro-active element.

8. A method as in claim 5, wherein the bus is connected to a transparent electro-active lead that reaches into a periphery of the electro-active lens.

9. A method as in claim 5, wherein the bus comprises a plurality of transparent electrical leads that radiate outward from the electro-active element.

10. A method as in claim 5, wherein the bus contains at least one perforation.

11. A method as in claim 1, wherein the electro-active element is connected to a controller.

12. A method as in claim 1, wherein the covering is formed by molding.

13. A method as in claim 1, wherein the covering is formed by surface-casting.

14. A method as in claim 1, wherein the covering is formed by conformal sealing.

15. A method as in claim 1, wherein the covering is formed by a lens wafer.

16. A method as in claim 2, wherein the lens blank is a finished lens blank having an optical power equal to a wearer's distance vision prescription.

17. A method as in claim 2, wherein the lens blank is a finished lens blank having an optical power equal to zero.

18. A method as in claim 1, wherein the electro-active element provides a refractive change.

19. A method as in claim 18, wherein the refractive change corrects for a higher order aberration.

20. A method as in claim 18, wherein the refractive change corrects for a refractive error of an eye other than myopia, hyperopia, presbyopia, and regular astigmatism.

21. A method as in claim 18, wherein the refractive change corrects for conventional refractive error of an eye; wherein the conventional refractive error is at least one of myopia, hyperopia, presbyopia or regular astigmatism.

22. The method of claim 1 where in the electro-active element is connected to a view detector.

23. A method of manufacturing an electro-active lens comprising:
   providing an electro-active element;
   covering an exposed surface of the electro-active element to produce an electro-active lens;
   wherein the electro-active element comprises a plurality of pixels,
   the electro-active lens is capable of focusing an image from ambient light,
   the exposed surface of the electro-active element is covered by a lens blank,
   the lens blank is selected from a group comprising a semi-finished blank, an unfinished lens blank, a lens wafer, a preformed optic and a finished lens blank,
   the lens blank corrects a wearer's refractive error other than myopia, hyperopia, presbyopia, and regular astigmatism, and
   the electro-active element corrects a spherical error of the wearer.

24. A method of manufacturing an electro-active lens from a lens blank comprising
   providing a lens blank comprising a front and back surface, a thickness and an index of refraction, the front or back lens blank surface having a recess;
   placing an electro-active element containing a plurality of pixels within the recess of the lens blank surface; and
   forming a covering layer over the surface of the lens blank containing the electro-active element;
   wherein the electro-active element is capable of focusing an image in ambient light; and
   wherein the covering layer is formed by way of curing an optical resin.

25. A method as in claim 5, wherein the bus is bonded to the lens blank.

* * * * *